United States Patent
Teyeb et al.

(10) Patent No.: US 12,192,797 B2
(45) Date of Patent: Jan. 7, 2025

(54) METHODS, ARCHITECTURES, APPARATUSES AND SYSTEMS DIRECTED TO BUFFER STATUS REPORT ENHANCEMENTS FOR XR TRAFFIC

(71) Applicant: InterDigital Patent Holdings, Inc., Wilmington, DE (US)

(72) Inventors: Oumer Teyeb, Montreal (CA); Jaya Rao, Montreal (CA); Tejaswinee Lutchoomun, Montreal (CA); Martino Freda, Laval (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 0 days.

(21) Appl. No.: 18/781,619

(22) Filed: Jul. 23, 2024

(65) Prior Publication Data
US 2024/0414567 A1  Dec. 12, 2024

Related U.S. Application Data

(63) Continuation of application No. PCT/US2024/022970, filed on Apr. 4, 2024.
(Continued)

(51) Int. Cl.
*H04W 24/02* (2009.01)
*H04W 76/20* (2018.01)
*H04W 80/02* (2009.01)

(52) U.S. Cl.
CPC ......... *H04W 24/02* (2013.01); *H04W 76/20* (2018.02); *H04W 80/02* (2013.01)

(58) Field of Classification Search
CPC ...... H04W 24/02; H04W 76/20; H04W 80/02
See application file for complete search history.

(56) References Cited

U.S. PATENT DOCUMENTS

2013/0094455 A1* 4/2013 Wu .................. H04W 28/0278
                                                        370/328
2019/0116582 A1* 4/2019 Pelletier ............... H04W 72/56
(Continued)

FOREIGN PATENT DOCUMENTS

EP  3737173 B1  10/2022

OTHER PUBLICATIONS

3rd Generation Partnership Project; Technical Specification Group Radio Access Network; NR; NR and NG-RAN Overall Description; Stage 2 (Release 16), 3GPP TS 38.300 V16.11.0, Dec. 2022, 152 pages.

(Continued)

*Primary Examiner* — Will W Lin
(74) *Attorney, Agent, or Firm* — VOLPE KOENIG

(57) ABSTRACT

In an embodiment, a method implemented in a WTRU is described. In an example, the method may include receiving configuration information indicating a remaining time threshold to be used for triggering transmission of a report related to a logical channel group (LCG). The method may include determining that a remaining time for a transmission of one or more PDUs associated with the LCG is below the remaining time threshold. The method may include transmitting the report related to the LCG in a MAC control element (MAC CE) based on at least the remaining time being below the remaining time threshold. In various embodiments, the report may include an indication of (i) the remaining time associated with the LCG and (ii) an amount of data associated with the LCG.

14 Claims, 11 Drawing Sheets

Related U.S. Application Data

(60) Provisional application No. 63/456,952, filed on Apr. 4, 2023.

(56) References Cited

U.S. PATENT DOCUMENTS

| | | | |
|---|---|---|---|
| 2021/0144580 A1* | 5/2021 | Alfarhan | H04L 47/215 |
| 2022/0217680 A1* | 7/2022 | Li | H04W 72/1263 |

OTHER PUBLICATIONS

3rd Generation Partnership Project; Technical Specification Group Radio Access Network; NR; Study on XR enhancements for NR; (Release 18), 3GPP TR 38.835 V1.0.0, Dec. 2022, 121 pages.
"Discussing on UE feedback enhancements for XR capacity", 3GPP Tdoc R2-2211590; 3GPP TSG-RAN2 Meeting #120, Toulouse, France, Nov. 14-18, 2022, 4 pages.
"Discussion on XR-specific feedback enhancements", 3GPP Tdoc R2-2212476; 3GPP RAN WG2 Meeting #120, Nov. 14-18, 2022, 3 pages.
3rd Generation Partnership Project; Technical Specification Group Services and System Aspects; Study on XR (Extended Reality) and media services (Release 18), 3GPP TR 23.700-60 V2.0.0, Nov. 2022, 266 pages.
Linhai et al., "Capacity improvements for XR services", 3GPP Tdoc R2-2300189; 3GPP TSG-RAN WG2 Meeting #121, Athens, Feb. 27-Mar. 4, 2023, 7 pages.
3rd Generation Partnership Project; Technical Specification Group Radio Access Network; NR; Radio Link Control (RLC) protocol specification (Release 17), 3GPP TS 38.322 V17.0.0, Mar. 2022, 33 pages.
3rd Generation Partnership Project; Technical Specification Group Services and System Aspects; Extended Reality (XR) in 5G (Release 16), 3GPP TR 26.928 V16.0.0, Mar. 2020, 131 pages.
3rd Generation Partnership Project; Technical Specification Group Radio Access Network, NR; Packet Data Convergence Protocol (PDCP) specification (Release 17), 3GPP TS 38.323 V17.0.0, Mar. 2022, 46 pages.

* cited by examiner

METHODS, ARCHITECTURES, APPARATUSES AND SYSTEMS DIRECTED TO BUFFER STATUS REPORT ENHANCEMENTS FOR XR TRAFFIC

CROSS-REFERENCE TO RELATED APPLICATIONS

This application is a continuation of International Patent Application No. PCT/US2024/022970, filed Apr. 4, 2024, which claims the benefit of U.S. Provisional Patent Application No. 63/456,952 filed Apr. 4, 2023, which is incorporated herein by reference in its entirety.

TECHNICAL FIELD

The present disclosure is generally directed to the fields of communications, software and encoding, including, for example, methods, architectures, apparatuses, systems directed to buffer status report enhancements for extended reality (XR) traffic.

BACKGROUND

Extended reality (XR) may include different types of immersive experiences such as e.g., virtual reality (VR), augmented reality (AR) and mixed reality (MR) and the realities interpolated among them. XR applications may be associated with different types of XR traffic. Embodiments described herein have been designed with the foregoing in mind.

BRIEF SUMMARY

Methods, architectures, apparatuses, and systems directed to buffer status report enhancements for XR traffic are described herein. In an embodiment, a wireless transmit/receive unit (WTRU) including circuitry including any of a processor, a transmitter, and a receiver is described herein. In an example, the circuitry may be configured to receive configuration information indicating a remaining time threshold to be used for triggering reporting information related to a protocol data unit (PDU) set. The circuitry may be configured to determine that a remaining time for a transmission of (e.g., one or more PDUs) in the PDU set is below the remaining time threshold. The circuitry may be configured to transmit report information related to the PDU set based on the determination that the remaining time is below the remaining time threshold. In various embodiments, the report information may indicate an amount of data remaining to be transmitted in the PDU set with the remaining time below the remaining time threshold.

In an embodiment, a method may be implemented in a WTRU. In an example, the method may include receiving configuration information indicating a remaining time threshold to be used for triggering reporting information related to a protocol data unit (PDU) set. The method may include determining that a remaining time for a transmission of (e.g., one or more PDUs) in the PDU set is below the remaining time threshold. The method may include transmitting report information related to the PDU set based on the determination that the remaining time is below the remaining time threshold. In various embodiments, the report information may indicate an amount of data remaining to be transmitted in the PDU set with the remaining time below the remaining time threshold.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

Figure 1A:
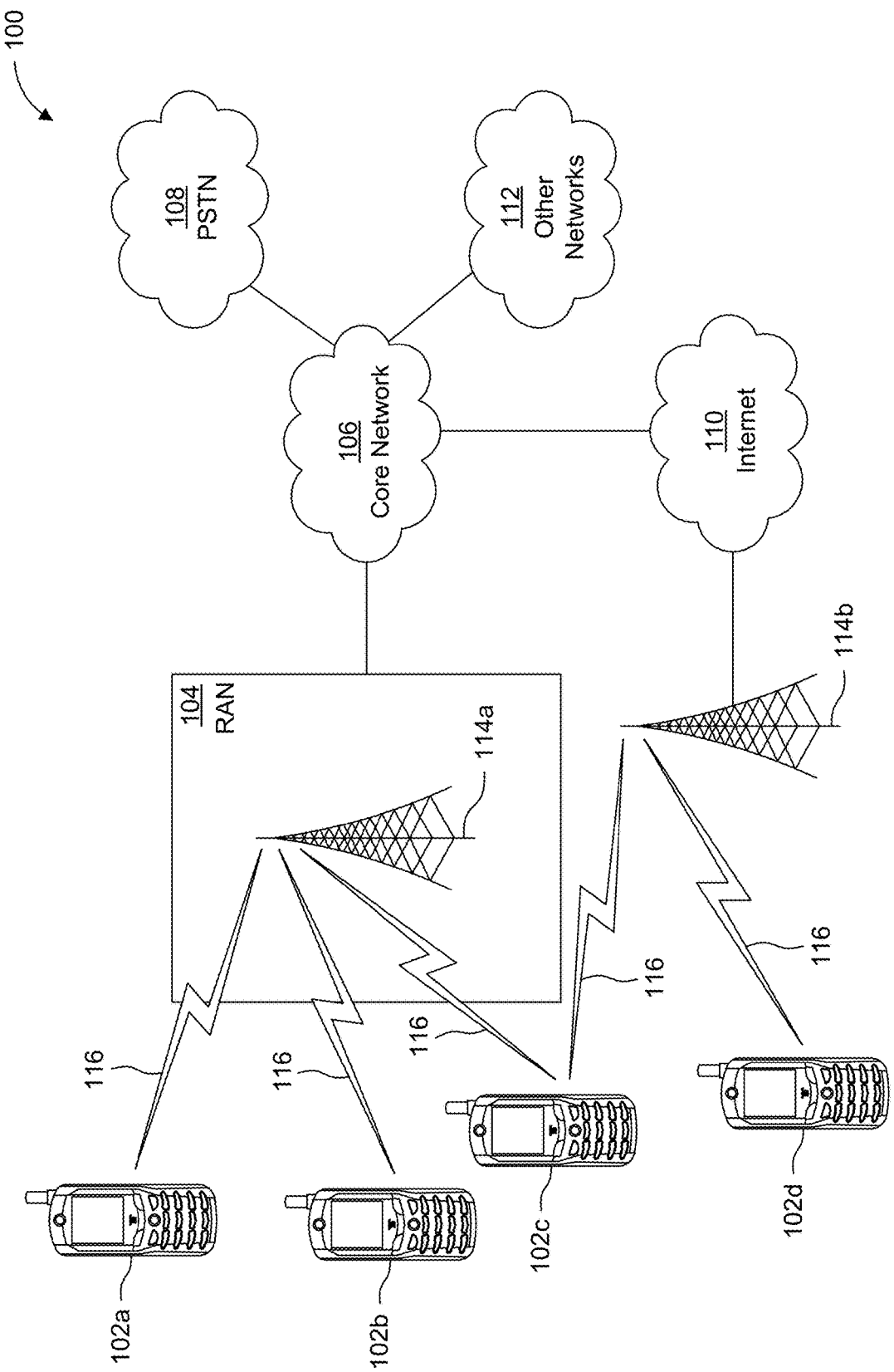
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d, e.g., to facilitate access to one or more communication networks, such as the CN 106/115, the Internet 110, and/or the networks 112. By way of example, the base stations 114a, 114b may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in an embodiment, the base station 114a may include three transceivers, i.e., one for each sector of the cell. In an embodiment, the base station 114a may employ multiple-input multiple output (MIMO) technology and may utilize multiple transceivers for each or any sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In an embodiment, the base station 114a and the WTRUs 102a, 102b, 102c may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In an embodiment, the base station 114b and the WTRUs 102c, 102d may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VOIP) services to one or more of the WTRUs 102a, 102b, 102c, 102d. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
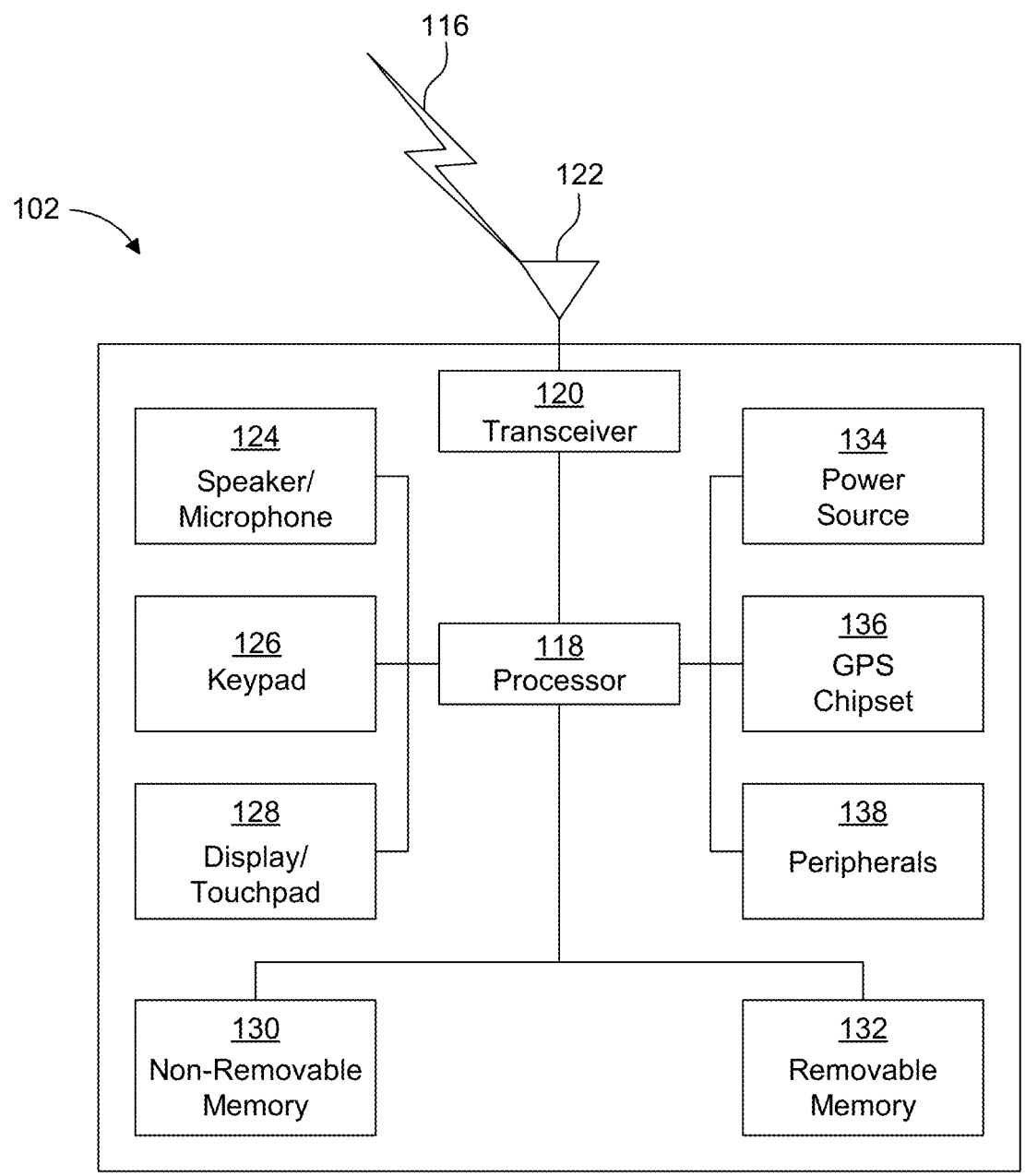
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114a) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
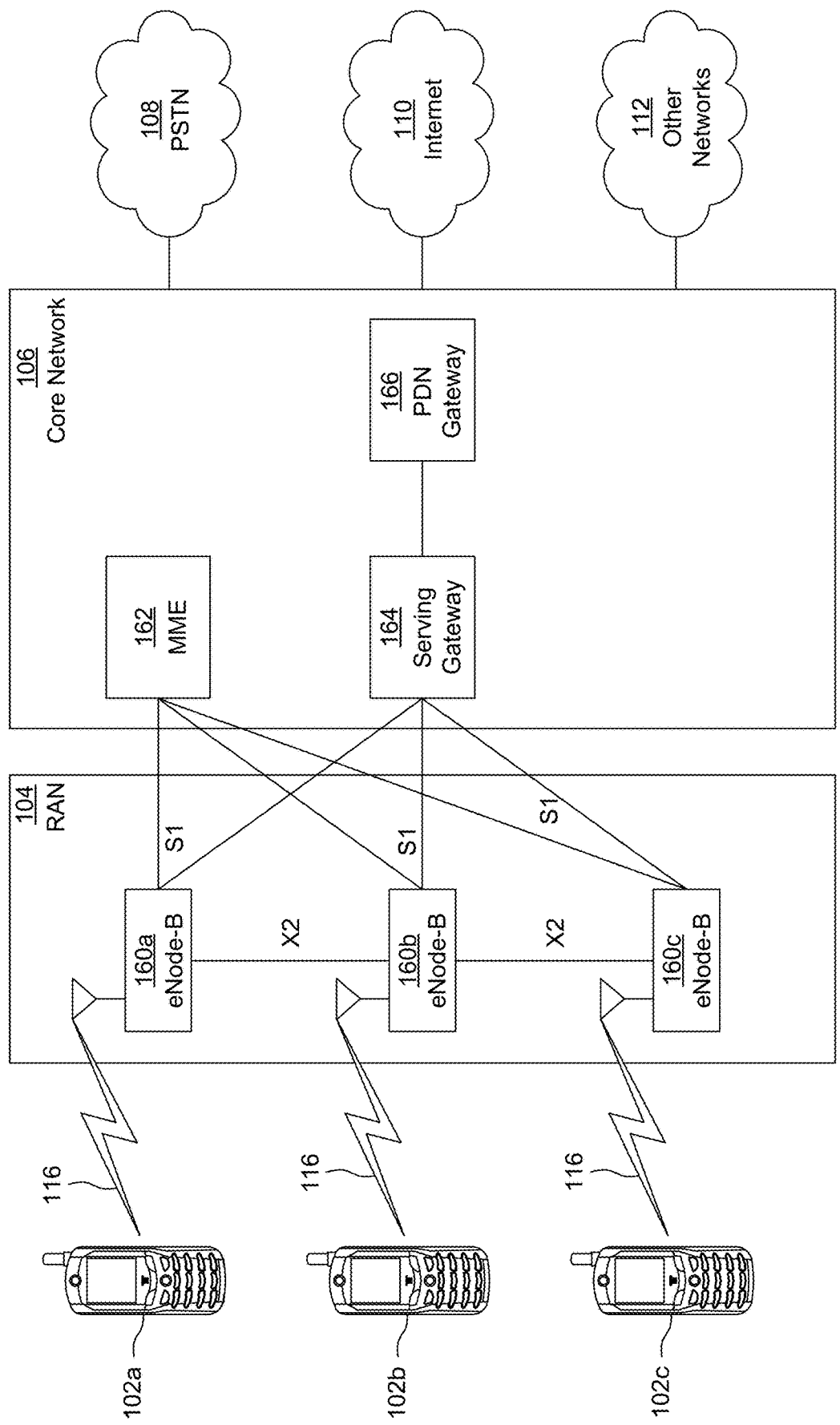
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, and 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In an embodiment, the eNode-Bs 160a, 160b, 160c may implement MIMO technology. Thus, the Node-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink (UL) and/or downlink (DL), and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160a, 160b, and 160c in the RAN 104 via an SI interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode-Bs 160a, 160b, 160c in the RAN 104 via the SI interface. The SGW 164 may generally route and forward user data packets to/from the WTRUs 102a, 102b, 102c. The SGW 164 may perform other functions, such as anchoring user planes during inter-eNode-B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHZ, 80 MHZ, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHZ, 4 MHZ, 8 MHZ, 16 MHZ, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHZ to 928 MHz. In Korea, the available frequency bands are from 917.5 MHZ to 923.5 MHz. In Japan, the available frequency bands are from 916.5 MHz to 927.5 MHz. The total bandwidth available for 802.11ah is 6 MHz to 26 MHz depending on the country code.

Figure 1D:
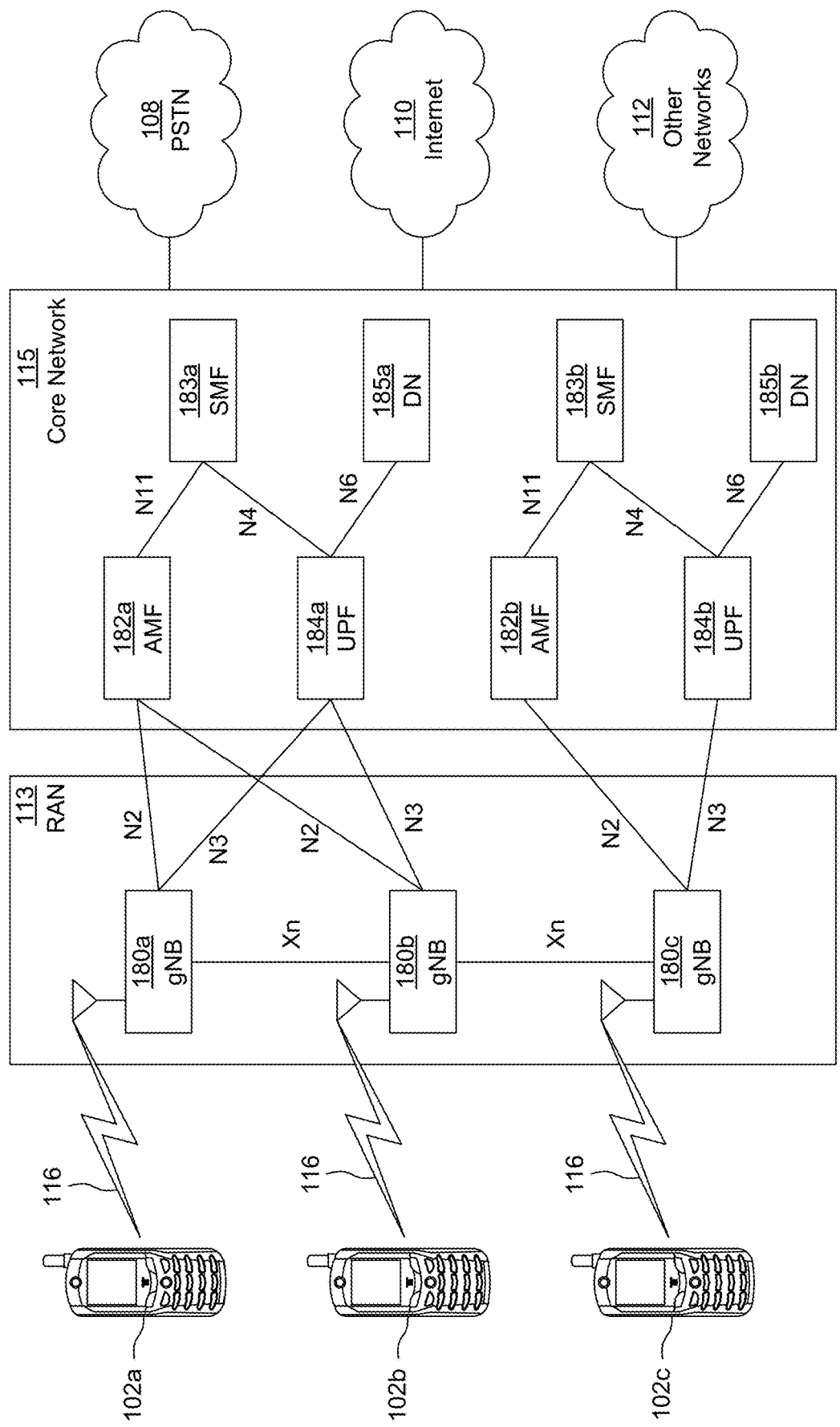
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In an embodiment, the gNBs 180a, 180b, 180c may implement MIMO technology. For example, gNBs 180a, 180b may utilize beamforming to transmit signals to and/or receive signals from the WTRUs 102a, 102b, 102c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (COMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184a, 184b, routing of control plane information towards access and mobility management functions (AMFs) 182a, 182b, and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one session management function (SMF) 183a, 183b, and at least one Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of NAS signaling, mobility management, and the like. Network slicing may be used by the AMF 182a, 182b, e.g., to customize CN support for WTRUs 102a, 102b, 102c based on the types of services being utilized by WTRUs 102a, 102b, 102c. For example, different network slices may be established for different use cases such as services relying on ultra-reliable low latency (URLLC) access, services relying on enhanced massive mobile broadband (eMBB) access, services for MTC access, and/or the like. The AMF 182a, 182b may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, e.g., to facilitate communications between the WTRUs 102a, 102b, 102c and IP-enabled devices. The UPF 184a, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In an embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to any of: WTRUs 102a-d, base stations 114a-b, eNode-Bs 160a-c, MME 162, SGW 164, PGW 166, gNBs 180a-c, AMFs 182a-b, UPFs 184a-b, SMFs 183a-b, DNs 185a-b, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may perform testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

For the sake of clarity, satisfying, failing to satisfy a condition, and configuring condition parameter(s) are described throughout embodiments described herein as relative to a threshold (e.g., greater, or lower than) a (e.g., threshold) value, configuring the (e.g., threshold) value, etc.). For example, satisfying a condition may be described as being above a (e.g., threshold) value, and failing to satisfy a condition may be described as being below a (e.g., threshold) value. Embodiments described herein are not limited to threshold-based conditions. Any kind of other condition and parameter(s) (such as e.g., belonging or not belonging to a range of values) may be applicable to embodiments described herein.

Throughout embodiments described herein, (e.g., configuration) information may be described as received by a WTRU from the network, for example, through system information or via any kind of protocol message. Although not explicitly mentioned throughout embodiments described herein, the same (e.g., configuration) information may be pre-configured in the WTRU (e.g., via any kind of pre-configuration methods such as e.g., via factory settings), such that this (e.g., configuration) information may be used by the WTRU without being received from the network.

Throughout embodiments described herein, the expression "a WTRU may be configured with something" may be used interchangeably with "a WTRU may receive configuration information indicating something". Throughout embodiments described herein, the expressions "the WTRU may report something", and "the WTRU may be configured to report something", is equivalent or may be used interchangeably with "the WTRU may transmit (e.g., reporting) information indicating something".

In embodiments described herein, "a" and "an" and similar phrases are to be interpreted as "one or more" and "at least one". Similarly, any term which ends with the suffix "(s)" is to be interpreted as "one or more" and "at least one". The term "may" is to be interpreted as "may, for example".

A symbol "/" (e.g., forward slash) may be used herein to represent "and/or", where for example, "A/B" may imply "A and/or B".

Throughout embodiments described herein the terms "serving base station", "base station", "gNB", "network" collectively "gNB" may be used interchangeably to designate any network element such as e.g., a network element acting as a serving base station. Embodiments described herein are not limited to gNBs and are applicable to any other type of serving base stations.

Throughout embodiments described herein, any network element of the RAN or of the core network (CN) may be referred to herein as "the network".

Extended Reality Overview

The term extended reality (XR) may include different types of immersive experiences such as e.g., any of virtual reality (VR), augmented reality (AR), mixed reality (MR) and any of the realities interpolated among them.

Virtual reality (VR) may be seen as a rendered version of a delivered visual and audio scene. The rendering may be designed to mimic the visual (e.g., stereoscopic 3D) and audio sensory stimuli of the real world to an observer (e.g., user) as he may move within the limits defined by the application.

Augmented reality (AR) may correspond to applications where a user may be provided with additional information such as e.g., any of artificially generated items and content overlaid upon a current environment.

Mixed reality (MR) may be seen as an advanced form of AR where one or more virtual elements may be inserted into the physical scene with the objective to provide the illusion that these elements may be part of the real scene. XR may include any (e.g., all) real-and-virtual combined environments and human-machine interactions generated by computer technology and/or wearables.

The notion of immersion in the context of XR applications (e.g., services) may refer to the sense of being surrounded by the virtual environment and providing the feeling of being physically and spatially located in the virtual environment. The levels of virtuality may range from partial sensory inputs to fully immersive multi-sensory inputs aiming at a virtual reality indiscernible from actual reality.

In embodiments described herein, XR devices may be associated with capabilities offering one or more degrees of spatial tracking. XR devices may include one or more sensors to enable spatial tracking, such as, for example, any of monocular/stereo/depth cameras, radio beacons, global positioning system (GPS), inertial sensors etc. For example, spatial tracking may be performed at different levels, such as e.g., three degrees of freedom-DoF (e.g., rotational motion along X, Y and Z axis), six DoF (e.g., rotational and/or translational motion along X, Y and Z axis). For example, spatial tracking may result in an interaction to experience some form of virtual content. The user may act in and/or interact with the components within extended reality. For example, the actions and/or interactions may involve any of movements, gestures, eye tracking etc. Spatial tracking may enable immersive XR experience. For example, some form of head and/or motion tracking may ensure that the simulated visual and audio components from the user perspective may be updated to be associated with user movements. Imprecise and/or delayed spatial tracking may lead to sensation of discomfort and/or motion sickness for the user.

In embodiments described herein, a WTRU may correspond to any XR device (e.g., network element) which may be in a variety of form factors. For example, a WTRU (e.g., XR WTRU) may include, without limitation, any of the following: head mounted displays (HMD), optical see-through glasses, camera see-through HMDs for any of AR and MR, mobile devices with positional tracking and camera, wearables etc. For example, there may be different types of XR WTRUs based on XR device functions such as e.g., any of display, camera, sensors, sensor processing, wireless connectivity, XR/media processing and power supply, to be provided by one or more devices, wearables, actuators, controllers and/or accessories. One or more devices (e.g., network elements, WTRUs) may be grouped into a collaborative XR group for supporting any of XR applications, XR experience and XR services.

Example of PDU Set and Data Burst

In a 5G network, a QoS flow may represent the finest level of granularity of QoS differentiation in a PDU session. The 5G QOS characteristics may be determined by (e.g., associated with) the 5G QoS identifier (5Q1). For example, each packet in a QoS flow may be treated (e.g., processed) according to the same QoS expectations.

For XR/media services, a group of packets may be used to carry payloads of a PDU set (such as e.g., a frame, a video slice, a video tile). A PDU set may comprise one or more PDUs carrying the payload of one unit of information generated at the application level (such as e.g., any of a frame and a video slice).

In media layer, packets of a PDU set may be decoded (e.g., processed) as a whole. For example, the frame/video slice may (e.g., only) be decoded in a case where all or at least an amount of the packets carrying the frame/video slice are received (e.g., successfully delivered). For example, a frame within a group of pictures (GOP) may (e.g., only) be decoded by the client in a case where all frames on which that frame may depend are successfully received. For example, the groups of packets within the PDU set may depend on (e.g., be associated with) each other e.g., in the media layer. Not considering such dependencies between the packets within the PDU set, may result in a scheduling of low efficiency from the 5G network. For example, the 5G network may randomly drop packet(s) and try to deliver other packets of the same PDU set, which may be useless to the client and may represent a waste of radio resources.

For example, any of audio samples, haptics applications and remote-control operations may have improved performances if the 5G network may consider the PDU set characteristics. For example, considering dependency between packets of a PDU set (such as e.g., a frame/video slice) may allow the 5G network to enhance radio resource efficiency and to promote user experience.

Third generation partnership project (3GPP) is studying enhancements on the current 5G QoS framework to support different QoS handling for PDU set. PDU sets may carry different pieces of content, such as e.g., any of I/B/P frames, and slices/tiles within an I/B/P frame, etc. For example, differentiated QoS handling may be studied where different importance of PDU sets may be considered, e.g., by treating (e.g., processing) packets (e.g., PDUs) belonging to less important PDU set(s) differently to reduce resource wasting.

A data burst may comprise a set of data PDUs generated and sent by the application in a short period of time. A data burst may comprise any number of PDUs belonging to one or more PDU sets.

A PDU set delay budget (PSDB) may represent an upper bound for the time that a PDU set may be delayed between the WTRU and the (e.g., network element of the 5G network at the) N6 termination point at the UPF. For example, a PSDB may be the upper bound of the time from the reception of the first PDU of the PDU set at the WTRU to the time the last PDU of the PDU set may be received (e.g., at the application layer) at the at the network (e.g., base station or UPF)

A time to live (TTL), which may be equal to PSDB may represent the elapsed time since the reception of the first (e.g., initial) PDU of the PDU set from the application level. The TTL may represent the amount of time before the time when the transmission of the PDU set may be useless as the receiver application may not be able to use the PDU set. In embodiments described herein the terms "TTL", "remaining delay" and "remaining time" may be used interchangeably to refer to a (e.g., ongoing) period of time after which, transmission of any remaining (e.g., not yet transmitted) delay critical data may be useless, and e.g., may be discarded. Delay critical data may be referred to herein as any of a PDU set, one or more PDUs of a PDU set, one or more PDUs of one or more PDU sets, and any kind of delay critical set of data.

A PDU-set error rate (PSER) may be an upper bound for the error rate of PDU-sets that may have been processed by the sender of a link layer protocol (e.g., radio link control (RLC) layer) where one or more PDUs in the PDU-set may not have been successfully received by the corresponding receiver and delivered to the upper layer (e.g., the packet data convergence protocol (PDCP) layer).

One or more PDU sets may be usable at the application layer (e.g., only) in a case where all PDUs of the PDU set are received (e.g., within the PSDB). Such one or more PDU sets may be flagged with (e.g., comprise flag information indicating) a PDU set integrated handing indication (PSIHI).

One or more PDU sets may be usable (e.g., even) in a case where one or more portions of the PDUs are not received.

Figure 2:
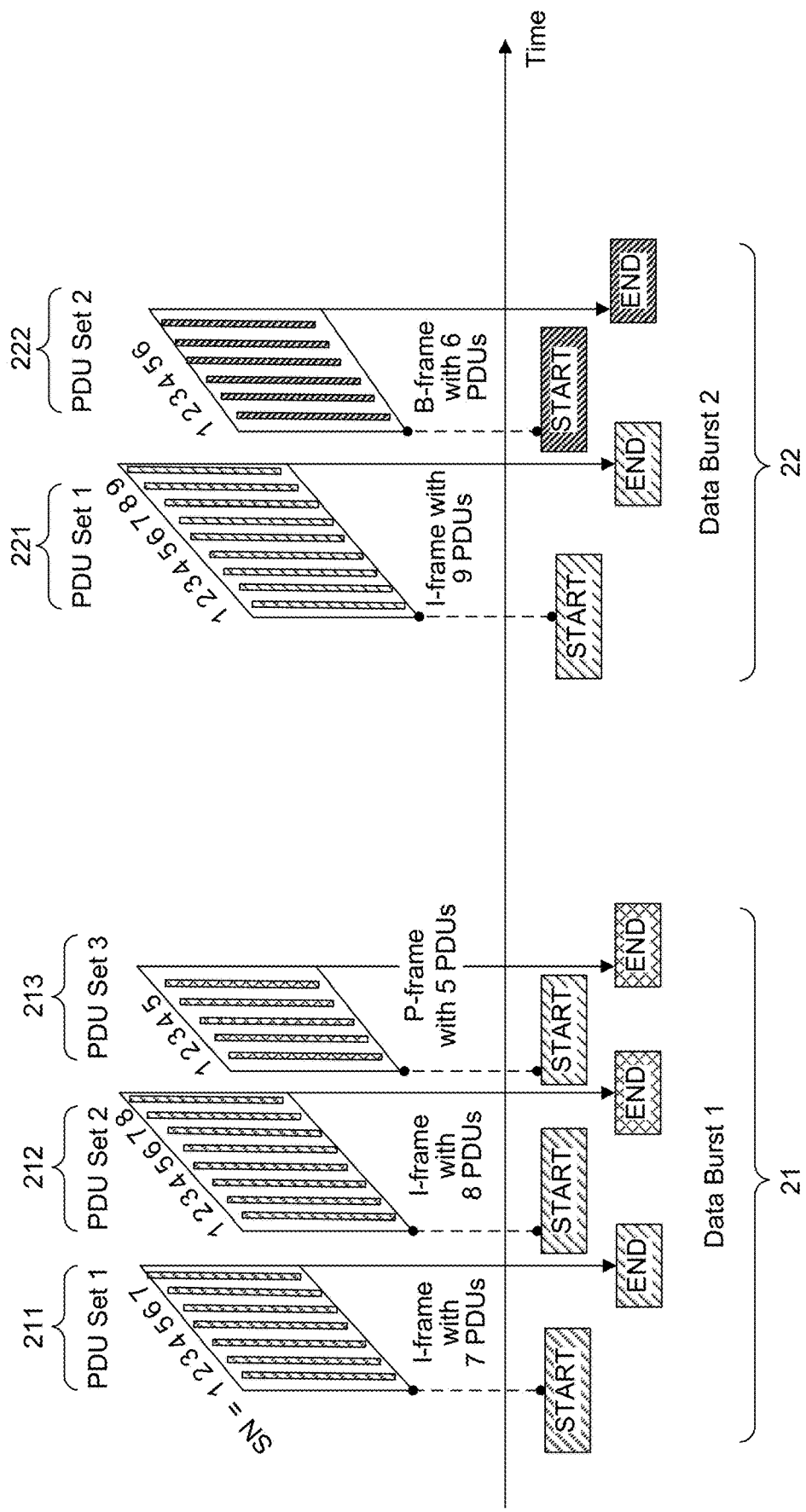
FIG. 2 is a diagram illustrating an example of a protocol data unit (PDU) sets and data bursts.

FIG. 2 is a diagram illustrating an example of PDU sets and data bursts. For example, a WTRU may transmit a first data burst 21 and a second data burst 22. The first data burst 21 may comprise a first PDU set 211 a second PDU set 212 and a third PDU set 213. The first PDU set 211 may comprise seven PDUs associated with a same I frame. The second PDU set 212 may comprise eight PDUs associated with a same I frame. The third PDU set 213 may comprise five PDUs associated with a same P frame.

The second data burst 22 may comprise a first PDU set 221 and a second PDU set 222. The first PDU set 221 of the second data burst 22 may comprise nine PDUs associated with a same I frame. The second PDU set 222 of the second data burst 22 may comprise six PDUs associated with a same B frame.

Example of Measurements in NR

Measurement performed by the WTRU may be used by the network for mobility decisions (such as e.g., handover).

For example, in a connected mode (such as e.g., RRC_CONNECTED), the WTRU may measure one or more beams of a cell and the measurement results (such as e.g., the power values) may be averaged to derive the cell quality (e.g., a cell quality metric). For example, the WTRU may be configured to consider (e.g., measure) a subset of the detected beams. Filtering may take place at least at two different levels, such as at the physical layer to derive beam quality and at radio resource control (RRC) level to derive cell quality from one or more beams. Cell quality from beam measurements may be derived in the same way for any of the serving cell(s) and the non-serving cell(s). Measurement reports may contain information indicating the measurement results of, for example, the X best beams in a case where the WTRU is configured to do so by the gNB (X being an integer number).

The measurement reporting configuration may be any of event triggered and periodical. In a case where measurement reporting configuration is periodical, the WTRU may send measurement report information every reporting interval (which may range between, for example, one hundred and twenty milliseconds and thirty minutes).

For event triggered measurement reporting, the WTRU may send measurement report information in a case where one or more conditions associated with the event are satisfied. The WTRU may keep on measuring any of the serving cell and one or more neighbors, may report a quantity (e.g., a metric) and may validate (e.g., evaluate) the quantity (e.g., metric) with any of the threshold and offset defined (e.g., indicated) in the report configuration. For example, any of the report quantity (e.g., metric) and the trigger for event may comprise any of a reference signal received power (RSRP), a reference signal received quality (RSRQ) and a signal-to-interference-plus-noise ratio (SINR).

There may be intra radio access technology (RAT) events and inter RAT events in NR.

Examples of Intra-RAT Events

In a first example of intra-RAT event, which may be referred to herein as A1 event, a metric associated with the serving cell may satisfy a condition (e.g., may become higher than a threshold). The A1 event may be used, for example, to cancel an ongoing handover procedure. This may be applicable in a case where a WTRU may move towards cell edge, may trigger a mobility procedure, and subsequently may move back into good coverage before the mobility procedure may have completed.

In a second example of intra-RAT event, which may be referred to herein as A2 event, a metric associated with the serving cell may fail to satisfy a condition (e.g., may become worse than a threshold). The A2 event may not involve any neighbor cell measurements. The A2 event may be used, for example, to trigger a blind mobility procedure, or the network may configure the WTRU for neighbor cell measurements in a case where the network receives measurement report information that may be triggered due to A2 event in order to save WTRU battery (e.g., to not perform neighbor cell measurement in a case where the serving cell quality is good enough).

In a third example of intra-RAT event, which may be referred to herein as A3 event, a metric associated with a neighbor cell may satisfy a condition (e.g., may become offset better than special cell (SpCell). The A3 event may be used, for example, for handover procedure. For example, an SpCell may be the primary serving cell of any of (i) the master cell group (MCG), e.g., the primary cell (PCell), and (ii) the secondary cell group (SCG), e.g., the primary secondary cell (PSCell). For example, in dual connectivity (DC) operation, the secondary node (SN) may configure an A3 event for SN triggered PSCell change. The A3 event may be used for any of conditional handover (CHO) and conditional PSCell change (CPC).

In a fourth example of intra-RAT event, which may be referred to herein as A4 event, a metric associated with a neighbor cell may satisfy a condition (e.g., may become higher than threshold). The A4 event may be used, for example, for handover procedures which may not depend upon the coverage of the serving cell (such as e.g., load balancing, where the WTRU may be handed over to a (e.g., good) neighbor cell (e.g., even) if the serving cell conditions are excellent).

In a fifth example of intra-RAT event, which may be referred to herein as A5 event, a first metric associated with a SpCell may fail to satisfy a first condition (e.g., may become worse than a first threshold) and a second metric associated with a neighbor cell may satisfy a second condition (may become higher than a second threshold). The A5 event (e.g., like the A3 event) may be used, for example, for handover. The A5 event (e.g., in contrast of the A3 event) may provide a handover triggering mechanism based on absolute measurements of the serving and neighbor cell, where the A3 event may be based on relative comparison. For example, the A5 event may be suitable for time critical handover, e.g., in a case where the serving cell becomes weak and the WTRU may change towards another cell which may not satisfy the criteria for an A3 event handover.

In a sixth example of intra-RAT event, which may be referred to herein as A6 event, a metric associated with a neighbor cell may satisfy a condition (e.g., may become offset better than a secondary cell (SCell). The A6 event may be used, for example, for SCell addition and/or releasing.

Examples of Inter-RAT Events:

In a first example of inter-RAT event, which may be referred to herein as B1 event, a metric associated with an inter RAT neighbor may satisfy a condition (e.g., may become higher than threshold). The B1 event may correspond to the A4 event for the case of inter-RAT handover.

In a second example of inter-RAT event, which may be referred to herein as B2 event, a first metric associated with the PCell may fail to satisfy a condition (e.g., may become worse than a first threshold) and a second metric associated with an inter RAT neighbor cell may satisfy a second condition (e.g., may become higher better than a second threshold). The B2 event may correspond to the A5 event for the case of inter-RAT handover.

For example, measurement event configuration (e.g., information) may include a time to trigger (TTT), which may indicate the duration the event conditions may be fulfilled (e.g., satisfied) before the WTRU may trigger the associated measurement reporting. TTT may be set to values ranging from zero (e.g., no TTT) to several minutes (up to five minutes in NR Rel-16).

Example of NR Conditional Handover and Conditional PSCell Addition or Change

NR Rel-16 introduced the concept of conditional handover (CHO) and conditional PSCell addition/change (CPA/CPC, collectively referred to as CPAC), for reducing the likelihood of radio link failures (RLF) and handover failures (HOF).

Legacy LTE/NR handover may be triggered, for example, by measurement report information. In another example, the network may send a HO command to a WTRU, e.g., without receiving any measurement report information. For example, the WTRU may be configured with an A3 event for triggering a measurement report to be sent in a case where a metric (e.g., the radio signal level/quality (e.g., any of RSRP, RSRQ, etc.)) of a neighbor cell becomes better (e.g. higher) than a corresponding metric of the primary serving cell (PCell) or of the primary secondary serving Cell (PSCell), in the case of dual connectivity (DC). The WTRU may monitor any of the serving and neighbor cells and may send measurement report information in a case where the (e.g., configured) conditions get fulfilled (e.g., satisfied). In a case where the network receives measurement report information, the network (current serving network element/cell) may prepare the HO command (for example, an RRC reconfiguration message, indicating a reconfiguration with synchronization (e.g., reconfiguration WithSync) and may send a HO command to the WTRU. The WTRU may receive and execute the HO command resulting in the WTRU connecting to the target cell.

CHO may differ from legacy handover in at least that more than one handover targets may be prepared (as compared to a single target in legacy case).

CHO may further differ from legacy handover in that the WTRU may not (e.g., immediately) execute the handover as in the case of the legacy handover. For example, the WTRU may be configured with any of one or more triggering conditions (e.g., a set of radio conditions), and the WTRU may execute the handover towards one of the targets (e.g., only) in a case where one or more of the triggering conditions are fulfilled (satisfied).

For example, a CHO command may be sent in a case where the radio conditions towards the current serving cells are (e.g., still) favorable, thereby reducing the two main points of failure in legacy handover, such as e.g., (1) the risk of failing to send measurement report information (e.g., in a case where the link quality to the current serving cell falls below acceptable levels e.g., for measurement report triggered in normal handover) and (2) the failure to receive the handover command (e.g., in a case where the link quality to the current serving cell falls below acceptable levels after the WTRU may have sent measurement report information, and before the WTRU may have received the HO command).

The triggering conditions for a CHO may be based on the radio quality of any of the serving cells and the neighbor cells such as any of the conditions that may be used in legacy NR/LTE to trigger measurement reports. For example, the WTRU may be configured with a CHO that may be associated with an A3 event like triggering conditions and associated HO command. The WTRU may monitor the current and serving cells and in a case where the A3 event triggering conditions are satisfied, the WTRU may not send measurement report information, may execute the associated HO command, and may switch its connection towards the target cell.

Figure 3:
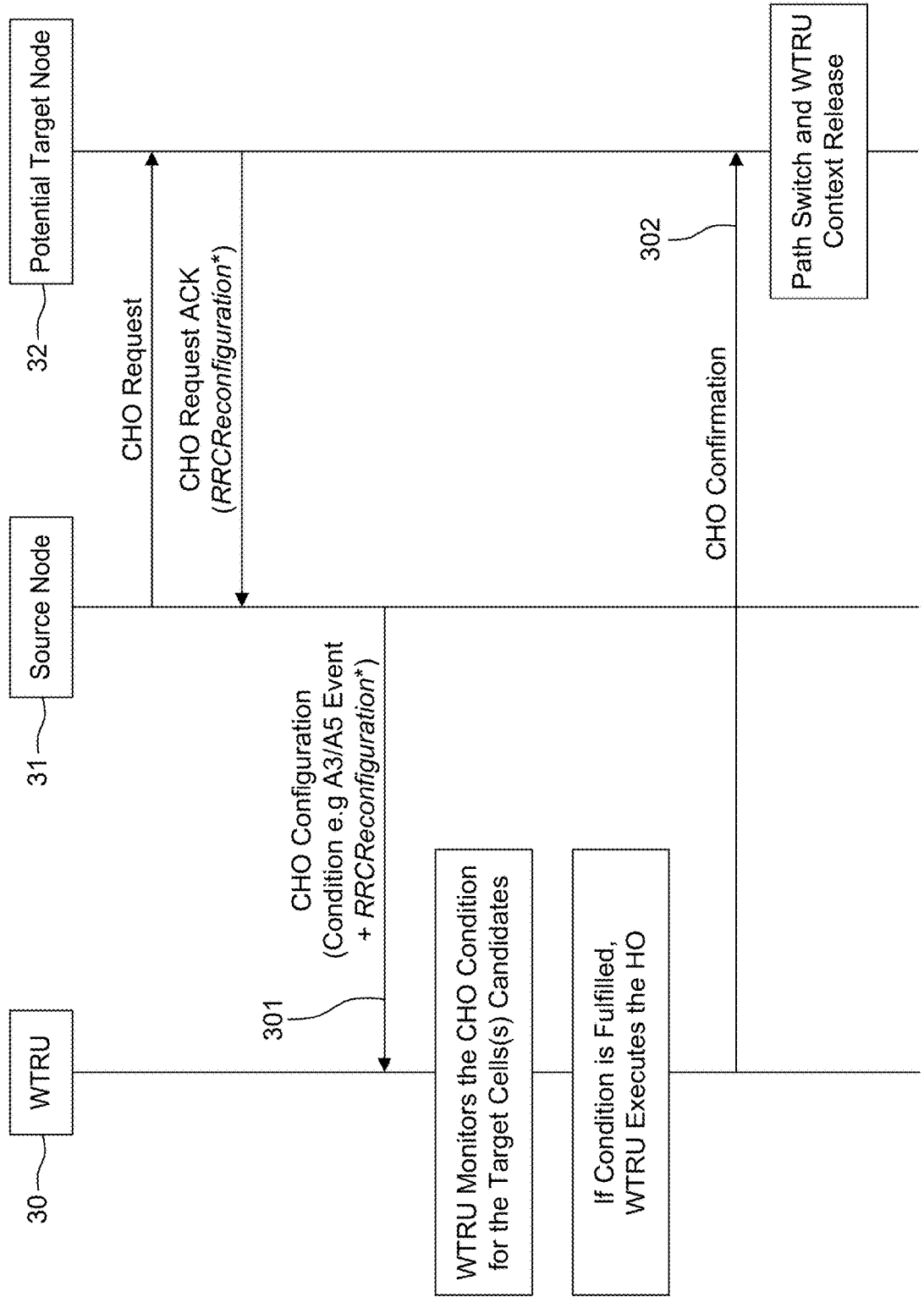
FIG. 3 is a diagram illustrating an example of conditional handover configuration and execution.

FIG. 3 is a diagram illustrating an example of conditional handover configuration and execution. For example, a WTRU 30 may perform a conditional handover from a source network element 31 to a target network element 32. The WTRU 30 may receive from the source network element 31, configuration information 301 indicating any of one or more conditions (e.g., associated with any of an A3 event and an A5 event), one or more parameters associated with the one or more conditions (such as e.g., any of threshold value, offset value), and parameters associated with a RRC reconfiguration). The WTRU may monitor the CHO condition for the target cell(s) candidates. In a case where a condition is satisfied for the target network element 32, the WTRU executes the handover towards the target network element 32 and send CHO confirmation information 302 to the target network element 32.

CHO may allow to prevent useless re-establishments in case of a radio link failure. For example, a WTRU may be configured with more than one CHO targets and the WTRU may experience a radio link failure (RLF) before any of the triggering conditions with any of the targets gets fulfilled. A legacy operation may have resulted in RRC re-establishment procedure that may have incurred interruption time for the bearers of the WTRU. With CHO, in a case where, after detecting an RLF, the WTRU ends up a cell for which it has a CHO associated with (e.g., the target cell may already be prepared for it), the WTRU may execute the HO command associated with this target cell (e.g., directly) and may not continue with the full re-establishment procedure.

CPC and CPA may be seen as extensions of CHO, directed to DC scenarios. For example, a WTRU may be configured with one or more triggering conditions for any of PSCell change and addition, and in a case where one or more of the triggering conditions are fulfilled, the WTRU may execute any of the associated PSCell change and PSCell add commands.

To enable the CHO/CPAC, new conditional measurement events are defined in NR. In a case where a condition associated with an event is satisfied, the CHO/CPAC configuration associated with the event may be executed.

For example, the condition associated with the event A3 (which may be referred to herein as CondEvent A3) may be satisfied in a case where (e.g., a metric associated with) the candidate cell becomes amount of offset better (e.g., higher) than any of the PCell and the PSCell.

For example, the condition associated with the event A4 (which may be referred to herein as CondEvent A4) may be satisfied in a case where (e.g., a metric associated with) the candidate cell becomes better (e.g., higher) than a threshold.

For example, the condition associated with the event A5 (which may be referred to herein as CondEvent A5) may be satisfied in a case where (e.g., a first metric associated with) any of the PCell and the PSCell becomes worse than an (e.g., absolute) first threshold and in a case where (e.g., a second metric associated with) the candidate cell becomes better (e.g., higher) than a second (e.g., absolute) threshold.

In addition to the radio condition based conditional events described herein, location and time-based conditional events have also been defined in NR (e.g., to be used in scenarios like non-terrestrial networks (NTN), where any of the time and the location of the moving satellite cells may be predictable, such that a WTRU may be instructed to perform a CHO/CPAC based on any of time and location).

In a first example, a condition (which may be referred to herein as CondEvent D1) may be satisfied in a case where the distance between the WTRU and a first reference location (e.g., referenceLocation1) becomes larger than a first configured threshold (e.g., Thresh1) and in a case where the distance between the WTRU and a second reference location (e.g., referenceLocation2) of a conditional reconfiguration candidate becomes shorter than a second configured threshold (e.g., Thresh2).

In a second example, a condition (which may be referred to herein as CondEvent T1) may be satisfied in a case where the time measured at the WTRU becomes more than a first configured threshold (e.g., Thresh1) and less than a second configured threshold (e.g., Thresh2).

For example, similarly to measurement reporting events, conditional event configuration information may include a time to trigger (TTT), which may indicate the duration the event conditions may be fulfilled before the WTRU may execute the CHO.

Example of Buffer Status Reporting

Throughout embodiments described herein the expressions "uplink buffer status report (BSR)", "buffer status report (BSR)" and BSR information" may be used interchangeably.

Uplink buffer status reports (BSR) may allow to provide support for QoS-aware packet scheduling. In NR, BSR information may be reported at a logical channel group (LCG) granularity. A WTRU may be configured with up to thirty-two logical channel identifiers (LCIDs), which may be grouped into up to eight LCGs. For example, one or more WTRUs may be configured with more than thirty-two LCIDs and more than eight LCGs (e.g., the mobile termination (MT) of an integrated backhaul access (IAB) node may be configured with up to 65855 LCIDs and 256 LCGs).

A BSR may be sent using a MAC control element (MAC CE) and may be sent in any of a short BSR format to report the data for (e.g., only) one LCG and a long BSR format to report the data from more than one LCGs.

BSRs may be transmitted using MAC Control Elements (MAC CEs). In a case where a BSR is triggered (e.g., in a case where new data arrives in the transmission buffers of the WTRU), and in a case where the WTRU doesn't have any available UL grants (e.g., resources) to send the BSR, a scheduling request (SR) may be transmitted by the WTRU to request for UL resources to transmit the BSR.

Any of (i) a periodic BSR timer (which may be referred to herein as periodicBSR-Timer), (ii) a retransmission BSR timer (which may be referred to herein as retxBSR-Timer), (iii) a logical channel SR delay timer applied, (which may be referred to herein as logicalChannelSR-DelayTimerApplied), (iv) a logical channel SR delay timer, (which may be referred to herein as logicalChannelSR-DelayTimer, (v) a logical channel SR mask, (which may be referred to herein as logicalChannelSR-Mask), and (vi) a logical channel group (which may be referred to herein aslogicalChannelGroup) may be configured via RRC to control the BSR.

The MAC entity may determine the amount of UL data available for a logical channel, for example, according to the data volume calculation procedure performed at any of RLC and PDCP.

In the data volume calculation, the WTRU (e.g., at RLC layer) may include any of the RLC data PDUs that may be pending for transmission and/or retransmissions, RLC service data units (SDUs) (or segments of RLC SDUs) that may not have been yet included in an RLC data PDU, and any pending status message such as e.g., RLC STATUS PDU described in 3GPP TS 38.322 "Technical Specification NR; Radio Link Control (RLC) protocol specification (Release 17)", V17.0.0.

The data volume calculation at PDCP layer may include any of the PDCP SDUs for which PDCP data PDUs may not have been constructed, PDCP data PDUs that may not have been transmitted to lower layers yet, any PDCP control PDUs, and any PDCP SDUs or PDUs that may be to be retransmitted based on PDCP re-establishment and/or PDCP data recovery as described in 3GPP TS 38.323 "Technical Specification NR; Packet Data Convergence Protocol (PDCP) Specification (Release 17)", V17.0.0.

A WTRU may trigger a BSR in a case where any of the following events occur.

In a first example, the WTRU may trigger a BSR in a case where UL data, for a logical channel belonging to an LCG, becomes available e.g., to the MAC entity, and in a case where this UL data belongs to a logical channel with higher priority than the priority of any logical channel containing available UL data belonging to any LCG.

In a second example, the WTRU may trigger a BSR in a case where UL data, for a logical channel belonging to an LCG, becomes available e.g., to the MAC entity, and in a case where none of the logical channels belonging to an LCG contains any available UL data. In any of the first and the second example, the BSR may be referred to as "regular BSR".

In a third example, the WTRU may trigger a BSR in a case where UL resources are allocated and the WTRU has less data than the resources may allow it to send, and the number of padding bits may be equal to or larger than the size of the buffer status report MAC CE plus its sub-header. In the third example, the BSR may be referred to as "padding BSR".

In a fourth example, the WTRU may trigger a BSR in a case where the retransmission BSR timer (e.g., retxBSR-Timer) expires, and at least one of the logical channels belonging to an LCG contains UL data. In the fourth example, the BSR may (e.g., also) be referred to as "regular BSR".

In a fifth example, the WTRU may trigger a BSR in a case where the periodic BSR timer (e.g., periodicBSR-Timer) expires, in which case the BSR may be referred to as "periodic BSR".

In a case where regular BSR triggering events occur for more than one logical channel at a same time (e.g., simultaneously), a (e.g., each) logical channel may trigger one separate regular BSR.

In embodiments described herein, BSRs may be sent per LCG and not per logical channel (LCH).

In embodiments described herein, a LCG may include (e.g., only) a single LCH.

For example, LCHs with similar priority may be linked to the same LCG. This may allow the gNB to differentiate between the volume of high priority data and the volume of lower priority data.

Overview

NR BSR may be triggered, for example, via timers (e.g., periodic BSR) and/or based on the arrival of new UL data, e.g., to be transmitted (e.g., in a case where this data belongs to a logical channel with higher priority than the priority of any logical channel containing available UL data belonging to any LCG, or in a case where none of the logical channels belonging to an LCG contains any available UL data).

XR traffic may include any of PDU sets and data bursts that may be inter-related and may include any of PDUs and PDU sets of different importance (e.g., priority, type) within the same bearer (e.g., mapped to the same LCID, or mapped to different LCIDs belonging to the same LCG, etc.,). For example, BSR triggering (e.g., only) based on the arrival of new data or high priority data may not allow to address XR traffic characteristics.

Embodiments described herein may allow to enhance the BSR triggering mechanisms of NR to accommodate the inter-relatedness and differences of PDUs within any of a PDU set and a data burst in XR.

Overview of BSR/SR Triggering Based on Remaining Time for the Delivery of the PDU Set and the Amount of Outstanding Data for the PDU Set.

Embodiments described herein may allow to expediate (e.g., accelerate) the transmission of a PDU set before the PSDB of the PDU set may have expired.

In an embodiment, a WTRU may be configured to trigger a BSR/SR in a case where at least one parameter associated with a transmission of a PDU set satisfies a condition. For example, the WTRU may be configured to trigger a BSR/SR in a case where the TTL for the PDU set is below a (e.g., configured) time duration (e.g., threshold) and the amount of outstanding data for the PDU set is above a buffer size (e.g., threshold).

For example, in a first step, the WTRU may receive (e.g., configuration information indicating) a configuration for sending a buffer status report (BSR) or a scheduling request (SR) related to a PDU set, where the BSR/SR may be triggered in a case where one or more of the following are conditions are satisfied.

In a first example, the BSR/SR may be triggered in a case where the amount of outstanding (e.g., buffered) data of that PDU set (such as e.g., any of a number of PDUs, a size of data in bytes, a percentage of PDUs, etc.) is above a (e.g., configured) buffer size (e.g., threshold).

In a second example, the BSR/SR may be triggered in a case where the TTL for the PDU set is below a (e.g., configured) time duration (e.g., threshold).

For example, in a second step, the WTRU may monitor any of the size of the PDU set in the UL buffer and the TTL of (e.g., for the LCG associated with) the PDU set.

For example, in a third step, upon determining that the buffered size of the pending PDUs of the PDU set is above the buffer size (e.g., threshold) or/and the TTL is below the time duration (e.g., threshold), the WTRU may transmit a BSR/SR related to the PDU set.

Overview of BSR/SR Triggering Based on Information Available for a PDU Set

Embodiments described herein may allow to send e.g., in a BSR (e.g., detailed) information about the PDU set to the network after that information may become available at the WTRU and/or after the PDU set information may have changed during the lifetime of the PDU set, such that network may be able to schedule the WTRU in an improved manner. The (e.g., detailed) information about the PDU set described herein may be referred to as PDU set information. In embodiments described herein the terms "PDU set information", "detailed PDU set information", "uplink traffic information", and "PDU set related information for uplink traffic" may be used interchangeably.

In an embodiment, a WTRU may be configured to trigger one or more BSRs/SRs related to a PDU set that may be dependent on information that may be available to the WTRU about the PDU set.

In a first example, the WTRU may trigger a BSR/SR related to a PDU set, after the arrival of a PDU of a PDU set (e.g., any of the first PDU, an intermediate PDU, the final PDU), (e.g., only) in a case where the WTRU has (e.g., detailed) information about the PDU set (e.g., any of size of the PDU set (e.g., in number of PDUs), periodicity, PSDB, type, importance, etc.). The (e.g., detailed) information may be included in the PDU header. In another example, the (e.g., detailed) information may be made available to (e.g., the network layer of) the WTRU by the application layer. The WTRU may include the (e.g., detailed) information about the PDU set, for example, in the BSR. In another example, reduced information may be provided, such as any of size and timing window when (e.g., all) the data may be expected to be available at the WTRU buffers.

In a second example, the WTRU may trigger a first BSR/SR related to a PDU set after the arrival of the first PDU of a PDU set (e.g., even) if the WTRU does not have (e.g., detailed) information about the PDU set at that time (e.g., the PDU may not include detailed information or WTRU may not have got the (e.g., detailed) information from application layer). The WTRU may include, for example, "expected" data size/timing information in this first BSR. In a case where the (e.g., detailed) information about the PDU set becomes available later (e.g., the WTRU may receive an intermediate PDU that may contain the (e.g., detailed) information, may receive the last PDU of the PDU set with the (e.g., detailed) information, etc.). The WTRU may send a second BSR/SR related to the PDU set that may include correct (e.g., updated) size/timing information. The BSR/SR may include a reduced (e.g., summarized) information, e.g., indicating a request for any of more/less resources, reduce/increase the preferred timing window for the resources' availability, etc.

Overview of BSR/SR Triggering Based on any of Radio Conditions and Conditions Related to Ongoing PDU Sets Embodiments described herein may allow to expediate (e.g., accelerate) the scheduling of ongoing PDU sets before a mobility event (e.g., handover) may be expected to happen, such that PDUs belonging to the same PDU set may be transmitted via the same path (e.g., cell, network element) and as such may experience similar latency and/or UL interruption during handover may not cause PSDB expiry.

In an embodiment, a WTRU may be configured to trigger a BSR/SR based on any of radio condition(s) and condition(s) related to ongoing PDU sets.

For example, the WTRU may receive (e.g., configuration information indicating) a configuration for triggering a BSR/SR that may be dependent on one or more of the following conditions.

In a first example of condition, the BSR/SR may be triggered based on one or more radio conditions towards the source or/and the target.

In a second example of condition, the BSR/SR may be triggered based on the remaining PDUs of ongoing PDU sets (e.g., any of a number of ongoing PDU sets, a size of remaining PDUs of PDU sets, etc.), wherein (i) all PDU sets may be considered or (ii) (e.g., only) a part of the PDU sets may be considered (e.g., any of PDU sets of a type or importance, PDU sets with PSDB below a threshold, PDU sets with TTL below a threshold, PDU sets with (e.g., only) a percentage/number of PDUs pending, etc.).

In a case where any of the conditions are satisfied, the WTRU may send a BSR/SR to the network including information about the ongoing PDU sets.

Terminology

Throughout embodiments described herein, the terms "node" and "network element" may be used interchangeably.

Throughout embodiments described herein, the network may include any of a base station (e.g., gNB, transmit/receive point (TRP), RAN node, access node), core network function (e.g., AMF) and application function (e.g., edge server function, remote server function), for example.

Throughout embodiments described herein, the term "source" may refer to a node or a cell the WTRU may have been originally connected to.

Throughout embodiments described herein, the term "target" may refer to a node or a cell the WTRU may be handed over to due to any of CHO and dual active protocol stack (DAPS) handover execution.

Throughout embodiments described herein, the terms "conditional handover", "conditional configuration" and "conditional reconfiguration" may be used interchangeably.

Embodiments are described herein related to UL data transmission. Throughout embodiments described herein, expressions such as "PDU received at WTRU" may be referred to herein as "a PDU received (e.g., obtained) at the WTRU radio buffer(s) from the application layer".

Throughout the solutions described herein, the terms "PDU" and "packet" may be used interchangeably.

Throughout embodiments described herein, the term "trigger" may be used interchangeably with any of "send" and "transmit".

Embodiments are described herein with a WTRU sending a BSR about a PDU set. A WTRU configured to send another (e.g., kind of) indication/information (such as e.g., any of a non-BSR MAC CE, RRC message, etc.) providing report information about the PDU set, that may or may not contain buffer size (e.g., level) information, may be applicable to embodiments described herein. In embodiments described herein the terms BSR, report information, and uplink information report may be used interchangeably.

Throughout embodiments described herein, flows may correspond to any of QOS flows and data flows (e.g., a flow of data may comprise one or more PDUs or application data units (ADUs), which may be associated with one or more QoS expectations (e.g., requirements), e.g., any of latency, data rate, reliability). Different flows, for example, originating from a common (e.g., application, experience) source and/or intended to a common destination device (e.g., WTRU) or group of associated devices (e.g., WTRUs) may be referred to herein as associated flows or correlated flows.

Throughout embodiments described herein, the expression "forwarding configuration" may correspond to forwarding information indicating any of (i) radio bearers (e.g. data radio bearers (DRBs) and/or signaling radio bearers (SRBs), (ii) logical channels (LCHs), (iii) logical channel groups (LCGs), (iv) configuration parameters in the individual layers within the access stratum (AS) protocol stack (e.g., any of service data adaptation protocol (SDAP), PDCP, RLC, MAC, PHY, other new protocol layers), (v) parameters associated with logical channel prioritization (LCP) (e.g., any of priority, prioritized bit rate (PBR), buffer size duration (BSD)), (vi) bandwidth parts (BWPs), (vii) carriers, (viii) radio links/interfaces (Uu links, sidelinks (SLs)), and (ix) radio resources (e.g., set of one or more frequency/time/spatial resources such as any of timeslots, subcarriers, and beams). Radio resources may be associated with configurated grants and/or dynamic grants and/or any other resource grants or grant free resources.

Throughout embodiments described herein, the expression "mapping configuration" may correspond to any of the following parameters and/or configurations associated with mapping from one or more (1) application data (e.g., PDU set) flows, QoS flows (e.g., associated or non-associated), to (2) one or more radio bearers, SDAP, PDCP, LCHs, carriers or component carriers (e.g. CCs in CA configurations), BWPs, and radio links/interfaces (e.g. Uu link and/or sidelinks), which may be used for delivering the PDUs in UL direction or DL direction, for example.

Throughout embodiments described herein, the expressions "XR/application-aware data transmissions/receptions" or "XR/application-aware QoS handling", may correspond to any of the following three examples.

In the first example, which may be referred to PDU set handling, a PDU set (e.g., any of a media unit, a video frame) may comprise of one or more PDUs. A PDU set may be associated with PDU set level QoS (e.g., requirements) properties (e.g., any of data rate, latency, reliability), which may be applicable for one or more or all PDUs associated with a PDU set. The different PDUs in a PDU set may be associated with individual PDU-level QOS (e.g., requirements) properties. Such associations and inter-dependencies may be visible to the AS-layers (e.g., with associated IDs) and/or handled at the AS layers with the awareness of the association during data transmission and reception.

In the second example, which may be referred to application/high layer importance/priority, the different PDUs in an PDU set or all PDUs in a PDU set may be associated with different application/high layer importance/priority values. Such (e.g., importance, priority, rank) value may correspond to a spatial (e.g., importance) value and/or a temporal (e.g., importance) value. A spatial (e.g., importance) value may comprise e.g., a spatial position of the video frame whose data may be carried by the PDU/PDU set, where PDUs/PDU sets carrying field of view (FoV) spatial positions may be associated with higher spatial (e.g., importance) value than non-FoV spatial positions). A temporal (e.g., importance) value may comprise e.g., a time sequence of the video frame whose data may be carried by the PDU/PDU set, where PDUs/PDU sets carrying base video frames such as I-frame may be associated with higher temporal (e.g., importance) value than differential video frames such as P-frame/B-frame). Such (e.g., importance) values may be visible to the AS layers (e.g., with associated IDs/markers/indications), for example, enabled by application awareness, during data transmission and/or reception.

In the third example, which may be referred to QoS flow handling, the PDUs/PDU sets of an application may be encoded and delivered by the application (e.g., layer) to a WTRU (e.g., for data flowing in UL) or to the network (e.g., for data flowing in DL) via one or more QoS/data flows. For example, the different QoS flows carrying the PDUs/PDU sets associated to an XR application (e.g., experience) may be visible to the AS-layers (e.g., with associated IDs) and/or handled at the AS layers with the awareness of the association during data transmission and/or reception.

Throughout embodiments described herein, the expression "the WTRU may be in the middle of transmitting/receiving packets belonging to any of PDU set and a data burst" may refer to the scenario where one or more PDUs of any of the PDU set and the data burst may have already been transmitted/received or may be transmitted/received, while others may remain pending in the WTRU/gNB buffers. The expression "ongoing PDU set or data burst" may be used to refer to the outstanding PDUs (e.g., not transmitted successfully, remaining to be transmitted by the WTRU for the UL case and not received successfully, remaining to be received by the WTRU for the DL case) within a PDU set or data burst. The above expressions and terms may also apply to the scenario where one or more packets associated with any of PDU sets, data bursts and QoS flows may be pending at the application/higher layers and/or may yet to arrive at the lower layer buffers at the WTRU/gNB for UL/DL transmission. The WTRU/gNB may be aware of packets that may be pending at the application/higher layers based on application (e.g., non-access stratum (NAS)) layer indications and/or markings in the previously received packet headers, for example. The above expressions and terms may also apply for non-XR traffic, which may comprise one or more standalone PDUs in any QoS flows e.g., without any association with PDU sets, media/video frames or data bursts.

For example, the WTRU may disregard (e.g., ignore) a BSR prohibit time that may be running due to legacy BSR mechanisms for determining to trigger a BSR for a PDU set according to any embodiment described herein (e.g., the WTRU may stop the BSR prohibit timer and may send the BSR related to the PDU set).

Throughout embodiments described herein, a PDU set is used as an example of data about which report information may be transmitted. Embodiments described herein are not limited to PDU sets and may be applicable to any kind of data such as, for example, delay critical data.

Throughout embodiments described herein, the terms "PDU set" and "delay critical data" may be used interchangeably.

Throughout embodiments described herein, the terms "size of buffered data", "amount of buffered data", "amount of outstanding buffered data of a PDU set", "buffered size of the pending PDUs of the PDU set" and "amount of data remaining to be transmitted in/for the PDU set" may be used interchangeably.

Configuration Aspects

The WTRU may receive configuration information for supporting any of the procedures, mechanisms, rules, actions, etc., described herein related to buffer status reporting. The WTRU may receive configuration information for supporting any of the procedures, mechanisms, rules, actions, etc., described herein at any time, for example, when the WTRU may be in connected mode, or when the WTRU may be resuming the connection from a suspended state or when the WTRU may be establishing the connection from idle state or re-establishing the connection after a failure.

The configuration information may be received by the WTRU from the network via, for example, any of (i) a HO command (such as e.g., any RRC reconfiguration message indicating reconfiguration with sync), (ii) a CHO configuration, (iii) RRC resume message, and (iv) any other (e.g., RRC) message.

For example, the WTRU may receive any configuration information element via any of (i) broadcast signaling (e.g., SIB), (ii) dedicated signaling, (iii) NAS layer signaling, and (iv) application layer signaling (e.g., messages). An example of dedicated signaling may include any RRC signaling and/or messages, such e.g., any of RRC reconfiguration, CHO configuration, DAPS HO command, RRC measurement reporting configuration, RRC resume, RRC setup, etc. An example of NAS layer signaling may include any of a PDU session establishment response and a PDU session modification command.

The configuration information that may be received by the WTRU from the network may include a combination of one or more of the following pieces of information.

For example, the configuration information may indicate any of a mapping configuration, a forwarding configuration, and a resource configuration and/or corresponding parameters.

For example, the WTRU may receive one or more configurations and/or sets of configuration parameters to be applied at different layers of the protocol stack (such as e.g., any of SDAP, PDCP, RLC, MAC, PHY and any new layer). The configuration parameters may include any of the following parameters.

For example, SDAP parameters may indicate any of one-to-one (e.g., 1-to-1), one to many (e.g., 1-to-M) and many to many (e.g., N-to-M) mapping configurations, markings/indications/IDs to apply (e.g. associated with any of QoS flows, PDU sets, data busts), association information indicating association between PDUs, PDU sets and/or data bursts, range of values associated with importance/priority of PDUs, PDU sets and/or data bursts.

For example, PDCP parameters may indicate any of rules and criteria for mapping PDUs, and/or PDU sets, and/or data bursts to two or more RLC entities/LCHs/legs.

For example, PDCP parameters may indicate any of rules and criteria for assigning sequence numbers (such as e.g., any of count range, hyper frame number (HFN) range, and SN range) for PDUs, and/or PDU sets and/or data bursts.

For example, PDCP parameters may indicate a robust header compression (RoHC) configuration to apply to legs associated with a source and/or a target.

For example, PDCP parameters may include security (e.g., encryption) parameters to apply to legs associated with a source and/or a target.

For example, PDCP parameters may include an indication and/or a flag indicating whether to apply any packet duplication.

For example, PDCP parameters may include any of rules and criteria for discarding PDU sets, and/or data bursts (e.g., discard timers).

For example, PDCP parameters may include any of rules and criteria for ensuring in-order delivery of PDUs, and/or PDU sets and/or data bursts.

For example, RLC parameters may indicate a mode (such as e.g., acknowledge mode (AM), unacknowledged mode (UM), transparent mode (TM)) and parameters to apply to the legs associated with a source and/or a target.

For example, MAC parameters may indicate any of rules and criteria to apply to the LCHs/MAC entities in the legs associated with a source and/or a target including any of (i) LCH parameters (e.g., priority, PBR, BSD), (ii) LCP (e.g., rules and/or restrictions for handling PDU sets and/or data bursts, time duration for changing between different LCP rules), and (iii) configurations for multiplexing PDU sets/ data bursts to transport blocks (TBs).

For example, PHY parameters may indicate one or more hybrid automatic repeat request (HARQ) configurations (e.g., number of allowed retransmissions).

The WTRU may receive information indicating at least one set of configuration parameters associated with a default configuration, which may be activated and/or used during a first (e.g., normal) operation for transmitting and/or receiving data during HO, for example. The WTRU may (e.g., also) receive information indicating another set of configuration parameters which may be associated with a second (e.g., exceptional) operation, for example, activated and/or used when detecting any of the triggering events/conditions during HO, for example.

For example, the configuration information may include validity information. For example, the WTRU may receive validity information associated with any of the forwarding configuration, the resource configuration, and the BSR triggering configuration, indicating whether (e.g., when) the configurations may be considered to be valid or invalid, based on one or more of the triggering events/conditions. The WTRU may (e.g., also) receive information indicating whether the configurations may be to be deactivated and/or released when determining them to be invalid.

Examples of WTRU Actions

Throughout embodiments described herein, WTRU actions, for example, related to application actions and/or AS-layer actions may correspond to any of the following example of WTRU actions.

In a first example, WTRU actions may correspond to performing measurements and reporting actions. For example, the WTRU may perform measurements of any of (1) pose (e.g., 6DoD/3DoD orientation, location/position) and (2) rate of motion (e.g., movement), etc. of any of the user, the WTRU and any other objects (e.g., virtual or real) with which the user may be interacting. The WTRU may send (e.g., report) information indicating the pose measurements to the network, any of periodically and after detecting event triggers (e.g., change in pose measurements above/ below a threshold).

For example, the WTRU may perform measurement(s) of one or more of (i) reference signals (e.g., any of synchronization signal block (SSB), channel state information reference signal (CSI-RS), positioning reference signal (PRS), sidelink reference signal (RS)), (ii) global navigation satellite system (GNSS) signals, (iii) unlicensed carriers, (iv) ultra-wideband signals, (v) light detection and ranging (LIDAR) signals, (vi) visual signals, etc.

In another example, the WTRU may perform measurements of any of the radio link interfaces associated with the WTRU (e.g., Uu link, SL).

For example, the WTRU may trigger transmission and/or measurement of reference signals in one or more other WTRUs (e.g., via Uu link and/or sidelink).

For example, performing measurement(s) and reporting action(s) may comprise sending measurement report information to the network and/or another WTRU.

In a second example, WTRU actions may correspond to handling/forwarding of data/PDUs/PDU sets and handling QoS associated with PDUs/PDU sets.

For example, data may include any of media (e.g., image, video frames), sensor data, and measurement data (e.g., pose measurements, link/channel measurements) determined by the WTRU, for example, for supporting an application/service/network request associated with the WTRU.

For example, the WTRU may send and/or receive data, to/from one more destination including any of a RAN node (e.g., gNB), a CN function/entity, application function (e.g., hosted in a WTRU or in the network).

For example, the WTRU may transmit and/or receive data, including user plane and/or control plane data, to/from the source and/or target, for example, when configured to perform DAPS handover and/or when configured with one or more DAPS radio bearers. In an example, such UL transmissions and/or DL receptions may be performed by the WTRU via the source or the target, one at a time. In another example, such UL transmissions and/or DL receptions may be performed by the WTRU via (e.g., both) the source and the target at a same time (e.g., simultaneously).

For example, the WTRU may perform any of splitting and merging of data and/or PDUs in one or more QoS flows into one or more forwarding configurations during transmission and/or reception.

In a third example, WTRU actions may correspond to handling/forwarding of information related to connectivity with the network and/or other WTRUs.

For example, WTRU actions may include sending capability information to the network, indicating any of a capability for supporting one or more interfaces, a capability to coordinate and/or interact with other WTRUs/devices (e.g., via SL interfaces), which may be co-located or non-co-located with the WTRU, for example.

For example, WTRU actions may include receiving configuration information, including receiving RRC configuration information from the gNB and/or NAS-layer configuration information from CN.

For example, WTRU actions may include sending and/or receiving assistance data to/from network associated with any of traffic, QoS, scheduling, etc., for supporting UL/DL transmissions.

For example, WTRU actions may include sending requests for radio resources and/or resource grants (e.g., any of dynamic grants, semi-static/configured grants).

For example, WTRU actions may correspond to triggering HO and data transmission/reception during HO.

For example, WTRU actions may include determining whether and when to trigger initial access with the target.

For example, WTRU actions may include transmitting or receiving initial access messages to target during HO execution.

For example, WTRU actions may include receiving RRC messages (e.g., HO command) from the source.

For example, WTRU actions may include transmitting RRC messages (e.g., RRC reconfiguration complete) to the target.

For example, WTRU actions may include determining whether to transmit any UL data (e.g., PDU sets, data bursts) to a source and/or a target.

For example, WTRU actions may include determining whether and when to release connection with the source.
Aspects Related to Mapping of PDU Sets and Bearers, Logical Channels, Etc.

A PDU-set may comprise one more PDUs.

For example, a PDU-set may comprise PDUs corresponding to (e.g., only) one type of frame (e.g., I-frame). In another example, a PDU-set may comprise PDUs corresponding to different types of frames (I-frames, P-frames, B-frames, etc.).

The size of the PDU-set may be variable from one PDU-set to another.

A PDU set delay budget (PSDB) may be the time from the reception of the first PDU of a PDU set at the WTRU (e.g., from application layer), until the last packet of the PDU set may be received at the network (e.g., base station or UPF) and/or at the application server.

A time to live (TTL), which may be referred to as remaining delay (e.g., related to the PSDB) for a PDU set may be equal to PSDB minus total time elapsed since first PDU of the PDU set may have arrived (e.g., been stored) at the WTRU transmission buffer.

In some examples, the PDUs within a PDU set may have different characteristics (e.g., type, importance), and it may be desirable to determine the path for the PDUs of the PDU set based on a combination of the characteristics of the PDUs within the PDU set (e.g., type, importance, etc.). For example, the WTRU may be able to determine or estimate the characteristics of the different PDUs within the PDU set at the start of the first PDU of the PDU set (e.g., based on information from the application layer and/or based on information on the headers of the first or first few PDUs at the start of the first PDU set, etc.)

For example, a data burst may contain PDU sets of different characteristics (e.g., any of different types, size, importance levels, PSDBs, etc.), and it may be desirable to determine the path for the data burst based on the combination of the characteristics of the PDU sets. For example, the WTRU may be able to determine or estimate the characteristics of the different PDU sets within the data burst at the start of the first PDU set within the data burst (e.g., based on information from the application layer and/or based on information on the headers of the first or first few PDUs at the start of the first PDU set, etc.)

The WTRU may perform mapping of the data units (e.g., any of PDUs, PDU sets, data bursts), received from upper layers (e.g., application) in one or more QoS flows (e.g., QoS flow identifiers (QFIs)), to one or more forwarding configurations comprising a combination of different DRBs and/or LCHs, during UL transmission.

Figure 4A:
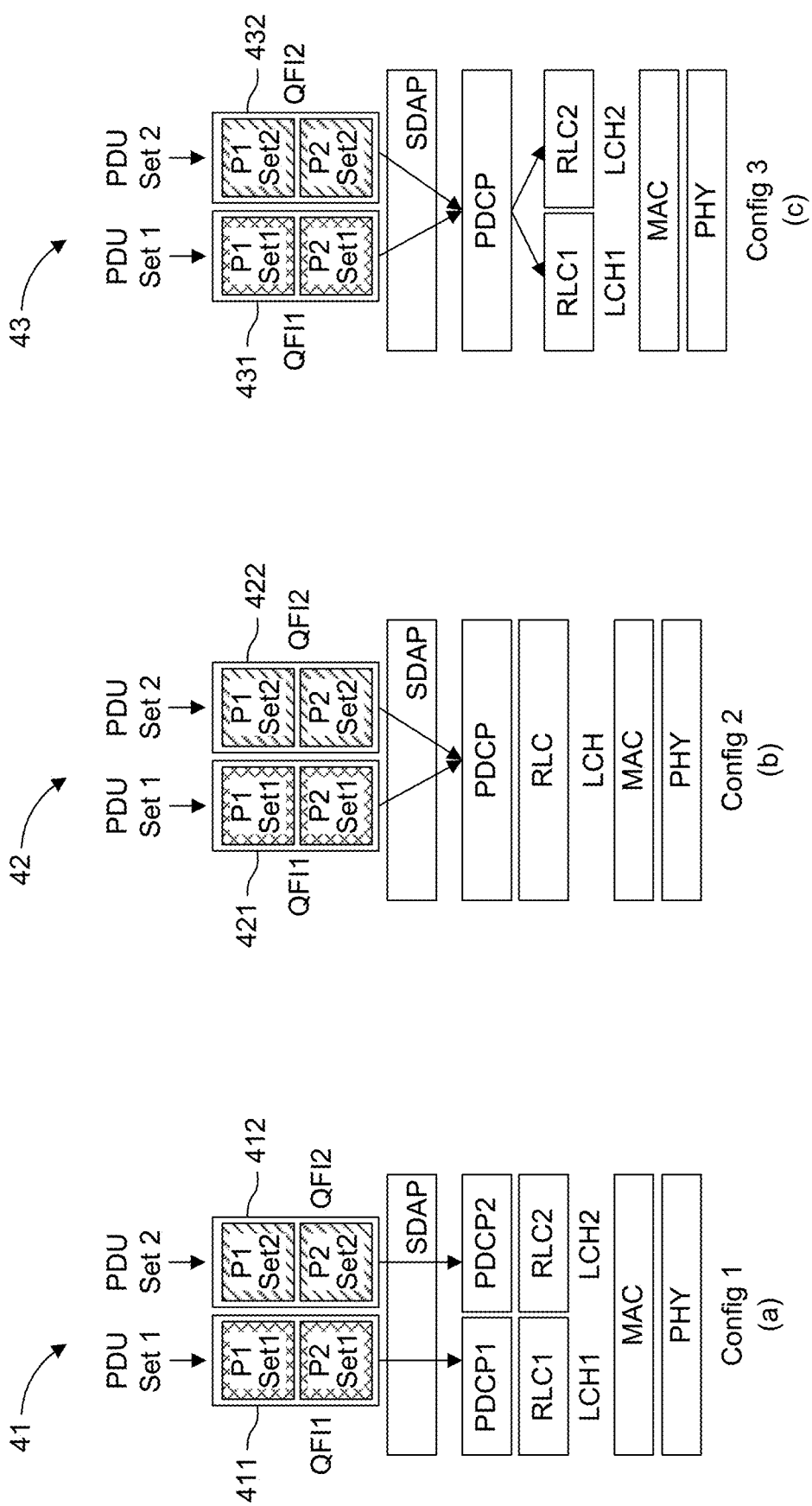
FIGS. 4A and 4B are diagrams illustrating six examples of forwarding configurations at access stratum layers for mapping extended reality (XR) data units during uplink transmission.
Figure 4B:
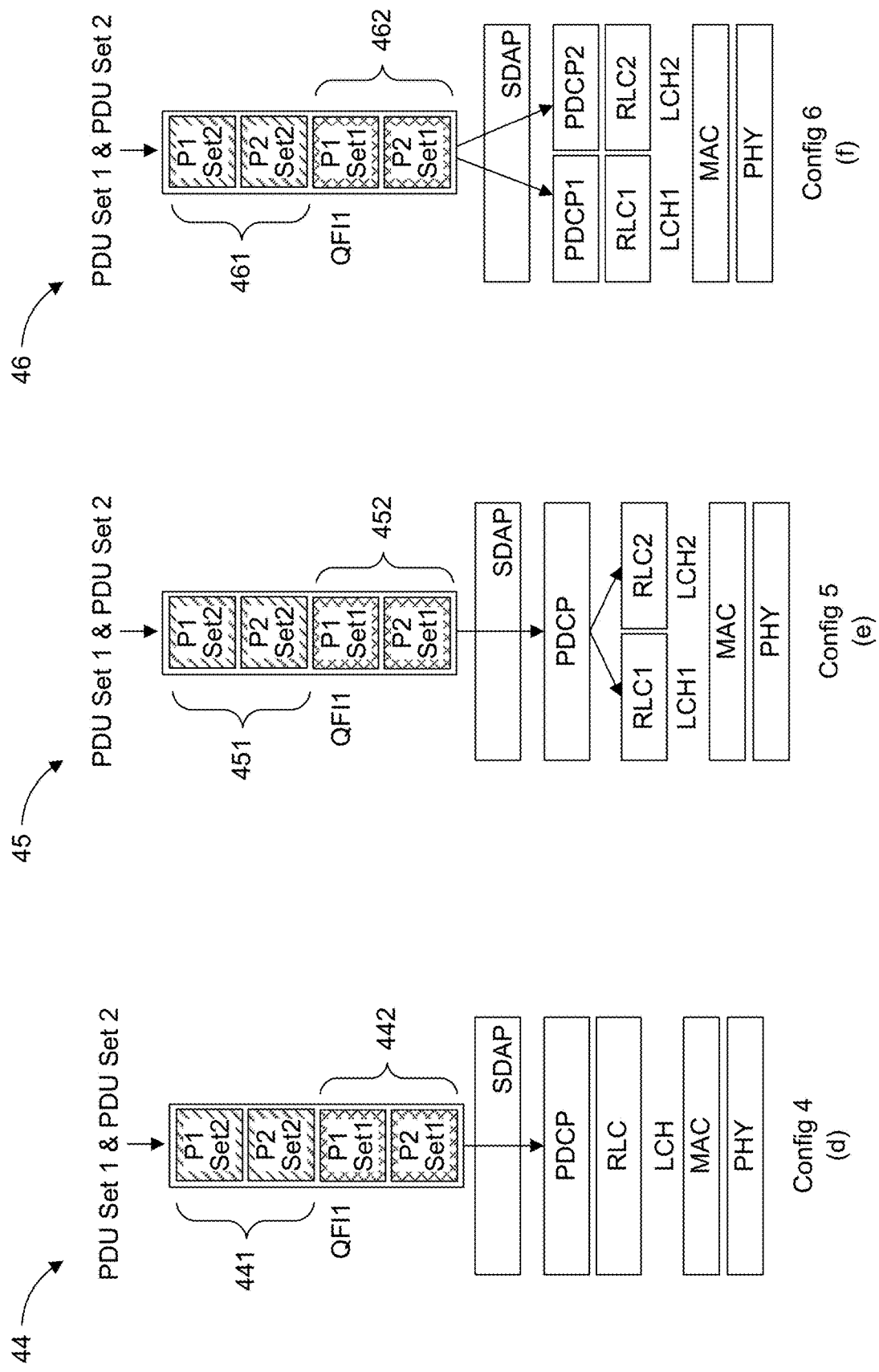

FIGS. 4A and 4B are diagrams illustrating six examples of forwarding configurations at AS layers for mapping XR data units during UL transmission.

In one example related to a first configuration 41, the WTRU may receive one or more PDUs associated with a first PDU set 411 and a second PDU set 412 in a first QFI QFI1 and a second QFI QFI2, respectively. The received PDU sets may be mapped to a first DRB (e.g., PDCP1) and a second DRB (e.g., PDCP2) at the SDAP sublayer/entity. For example, a (e.g., each) PDCP entity (e.g., PDCP1 and PCDP2) may be configured support in-order delivery of PDUs in the first PDU set 411 and the second PDU set 412, respectively. The PDUs of the first PDU set 411 and second PDU set 412 may be mapped to a first LCH LCH1 and a second LCH LCH2, for example, corresponding to RLC1 and RLC2 respectively. The MAC entity/sublayer may ensure the QoS of the PDU sets 411, 412 (e.g., PSDB) in the respective LCHs may be met, for example, based on the PDU set parameters (e.g., priority) and/or using LCP procedure, during scheduling and/or multiplexing of the PDU sets 411, 412 into one or more TBs for UL transmission, for example.

In one example related to a second configuration 42, the WTRU may receive one or more PDUs associated with a first PDU set 421 and a second PDU set 422 in a first QFI QFI1 and a second QFI QFI2, respectively. The received PDU sets 421, 422 may be multiplexed/mapped to a DRB (e.g., PDCP) at the SDAP sublayer/entity. The PDUs of the first PDU set 421 and the second PDU set 422 may be mapped to a LCH, for example, corresponding to RLC. The MAC entity/sublayer may ensure the QoS of the PDU sets 421, 422 (e.g., PSDB) in the LCH may be met, for example, based on the PDU set parameters (e.g., priority, SNs) and/or using LCP procedure, during scheduling and/or multiplexing of the PDU sets 421, 422 into one or more TBs for UL transmission, for example.

In one example related to a third configuration 43, the WTRU may receive one or more PDUs associated with a first PDU set 431 and a second PDU set 432 in a first QFI QFI1 and a second QFI QFI2, respectively. The received PDU sets 431, 432 may be mapped to a DRB (e.g., PDCP) at the SDAP sublayer/entity. The PDUs of the first PDU set 431 and the second PDU set 432 may be mapped to a first LCH LCH1 and a second LCH LCH2, for example, corresponding to a first RLC RLC1 and a second RLC RLC2 respectively. The MAC entity/sublayer may ensure the QoS of the PDU sets 431, 432 (e.g., PSDB) in the respective LCHs may be met, for example, based on the PDU set parameters (e.g., priority) and/or using LCP procedure, during scheduling and/or multiplexing of the PDU sets 431, 432 into one or more TBs for UL transmission, for example.

In another example related to a fourth configuration 44, the WTRU may receive one or more PDUs associated with a first PDU set 441 and a second PDU set 442 in a QFI QFI1. The received PDU sets 441, 442 may be mapped to a DRB (e.g., PDCP) at the SDAP sublayer/entity. The PDUs of the first PDU set 441 and the second PDU set 442 may be mapped to a LCH, for example, corresponding to RLC. The MAC entity/sublayer may ensure the QoS of the PDU sets 441, 442 (e.g., PSDB) in the LCH may be met, for example, based on the PDU set parameters (e.g., priority) and/or using LCP procedure, during scheduling and/or multiplexing of the PDU sets 441, 442 into one or more TBs for UL transmission, for example.

In another example related to a fifth configuration 45, the WTRU may receive one or more PDUs associated with a first PDU set 451 and a second PDU set 452 in a QFI QFI1. The received PDU sets 451, 452 may be mapped to a DRB (e.g., PDCP) at the SDAP sublayer/entity. The PDUs of the first PDU set 451 and the second PDU set 452 may be mapped to a first LCH LCH1 and a second LCH LCH2, for example, corresponding to RLC1 and RLC2 respectively. The MAC entity/sublayer may ensure the QoS of the PDU sets 451, 452 (e.g., PSDB) in the respective LCHs may be met, for example, based on the PDU set parameters (e.g., priority) and/or using LCP procedure, during scheduling and/or multiplexing of the PDU sets 451, 452 into one or more TBs for UL transmission, for example.

In one example related to a sixth configuration 46, the WTRU may receive one or more PDUs associated with a first PDU set 461 and a second PDU set 462 in a QFI QFI1. The received PDU sets 461, 462 may be mapped to a first DRB DRB1 (e.g., PDCP1) and a second DRB DRB2 (e.g., PDCP2) at the SDAP sublayer/entity. Each PDCP entity (e.g., PDCP1 and PCDP2) may be configured support in-order delivery of PDUs in the first PDU set 461 and the second PDU set 462, respectively. The PDUs of the first PDU set 461 and the second PDU set 462 may be mapped to the first LCH LCH1 and the second LCH LCH2, for example, corresponding to RLC1 and RLC2 respectively. The MAC entity/sublayer may ensure the QoS of the PDU sets 461, 462 (e.g., PSDB) in the respective LCHs may be met, for example, based on the PDU set parameters (e.g., priority) and/or using LCP procedure, during scheduling and/or multiplexing of the PDU sets 461, 462 into one or more TBs for UL transmission, for example.

Example of BSR Related to One or More PDU Sets

The BSR triggered according to any embodiment described herein may be a legacy BSR. For example, the BSR may include information of LCGs and corresponding buffer levels. The WTRU may be configured to ensure that the LCG corresponding to the PDU set that may have triggered the BSR may be included in the BSR. For example, in a case where the PDCP of the bearer containing the PDU set is associated with a LCH x and in a case where this LCH x is mapped to a LCG y, information about LCG y may be included in the BSR. In determining the buffer level to report in the BSR, the WTRU may be configured to consider (e.g., only) the buffered data of the PDU set(s) that may have triggered the BSR. For example, non XR traffic mapped to LCHs that may be mapped within the same LCG as the XR traffic that may be triggering the BSR may not be counted in the buffer calculation. In another example, XR traffic mapped to the same LCG and belonging to an XR traffic that may not have triggered the BSR may not be counted in the buffer calculations.

Depending on the UL grant available, the WTRU may include information about other LCGs (e.g., LCGs that may have no XR traffic, e.g., no PDU sets may be mapped to them, or LCGs containing XR traffic other than the XR traffic that may have generated the BSR, etc.).

The BSR triggered according to any embodiment described herein may use a (e.g., new) BSR format (of e.g., report information/message) that may include information about a PDU set, e.g., rather than (e.g., only) information at LCG level. For example, a BSR may contain information indicating one or more of the following elements.

For example, a BSR may indicate a PDU set identity.

For example, a BSR may indicate a PDU set importance level.

For example, a BSR may indicate a PDU set type.

For example, a BSR may indicate a PDU set integrated handing indication (PSIHI) or not (e.g., indicating whether (e.g., all) the PDUs of the PDU set may be to be received at the receiver application layer before the PDU set may be decoded/used).

For example, a BSR may indicate a PDU set PSDB.

For example, a BSR may indicate a PDU set TTL (e.g., at the time of the construction of the BSR).

For example, a BSR may indicate a total PDU set size (e.g., any of number of PDUs, size in bytes, etc.).

For example, a BSR may indicate a size of buffered data of the PDU set at the WTRU (e.g., radio) buffers (e.g., any of as an absolute value, as a percentage of the total PDU set size, in bytes, in number of PDUs, etc.)

For example, a BSR may indicate the size of the data of the PDU set that may (e.g., still) be pending at the application layer (e.g., any of as an absolute value, as a percentage of the total PDU set size, in bytes, in number of PDUs, etc.).

For example, a BSR may indicate one or more time window/size values, indicating the size of expected data and the time window in which they may be expected to be available at the WTRU.

The information about any of an importance level, a type, a PSDB, a TTL and a PDU set size may be any of the (e.g., actual) value and an index value that may be used to refer to one or more values. For example, the PSDB may be categorized in n categories (e.g., 0 if PSDB is less than x1, 1 if PSDB is between x1 and x2, . . . n if PSDB is greater than xn, etc.) and the BSR may include (e.g., only) the index n associated with the PSDB.

Different BSR buffer size index tables may be configured for different PDU set characteristics (e.g., a first table for PDU sets of a first type, a second table for PDU sets of a second type, etc.). Considering that PDU sets may have different ranges of PDU set size, depending on their characteristics, dimensioning the BSR reporting to include the maximum possible PDU size regardless of PDU set characteristics may not be efficient.

A BSR related to a PDU set may contain information (e.g., only) about one PDU set or more than one PDU sets (e.g., based on the UL grant).

A WTRU may be configured to not send a BSR of one or more PDU sets using a MAC CE, and to send a BSR of one or more PDU sets using an RRC message. Sending buffer related information via RRC instead of MAC CE may allow to include more detailed information, for example, if the BSR is for multiple PDU sets and/or if additional information to buffer level information is to be included.

SR Aspects

Throughout embodiments described herein, in a case where the WTRU has determined that conditions to trigger a BSR may be satisfied and in a case where no UL resources may be available to send the BSR, the WTRU may trigger an SR (i.e., as in legacy NR operation).

A SR that may be sent based on a BSR related to a PDU set triggered according to any embodiment described herein, may differ from an SR sent based on legacy BSR. For example, different SR resources may be configured (e.g., associated) for the different types of PDU set related BSR and BSR triggering conditions/causes (e.g., such that the network may be informed implicitly from the resources the SR may be sent on, what kind of PDU set this BSR may be referring to, what may have caused the triggering of the BSR, etc.). In an example, the WTRU may be configured with periodic physical uplink control channel (PUCCH) resources for sending SR periodically, where the configured periodicity values of the physical uplink shared channel (PUSCH) resources may be associated with one or more periodicity values of the XR traffic (e.g., periodic PDU sets).

Periodic BSR and Periodicity of PDU Set

In an embodiment, the WTRU may be configured to send periodic BSR reports concerning one or more PDU sets. For example, The WTRU may be configured to send a BSR report every nth PDUs, nth PDU of any of a PDU set type, importance, PSDB range, etc.

In an example, a periodic BSR may be configured with a periodicity that may be matching the periodicity of an ongoing PDU set (e.g., may be equal to the PDU set periodicity or may be a multiple of that). In a case where there are more than one ongoing PDU sets with different periodicities (e.g., periodicity1, periodicity2, periodicity3, etc.), the WTRU may be configured to send the periodic BSR with a periodicity equal to any of the largest periodicity among the periodicities of the PDU set, the smallest periodicity, the mean/median periodicity, etc. For example, the WTRU may be configured to use the periodicity of the PDU set of any of the highest importance, of a type, etc.

Network Triggered BSR for One or More PDU Sets

Embodiments described herein focus on BSR triggered based one or more conditions monitored by the WTRU. In other examples, the network may explicitly request a BSR (and/or other PDU set related information) from the WTRU. For example, the network may request the WTRU to send information and buffer status about one or more PDU sets.

For example, the network may send a request for the WTRU to send information indicating the buffer level or/and additional information (e.g., indicating any of a type, an importance, a PSDB, etc.) of a PDU set(s) by explicitly indicating a PDU set identity (identities). In another example, the network may (e.g., only) indicate the PDU sequence number(s), from which the WTRU may implicitly determine the PDU set(s) (e.g., the WTRU may send information about the PDU set(s) to which the indicated PDU(s) may belong to).

Embodiments have been described herein with the example of BSR/SR triggering. Any information sent by the WTRU about the PDU set (any of dynamic information e.g., indicating the pending (e.g., ongoing buffer size) and static or semi-static information e.g., indicating a PDU set type or importance), using a signaling at any protocol layer (e.g., any of uplink control information (UCI), MAC CE, RRC, . . . ), autonomously and/or on request from the network may be applicable to embodiments described herein.

The WTRU may be configured with a behavior that may depend on any of the active bearer and the application type. For example, the WTRU may be configured to apply any behavior according to any embodiment described herein if there is an active VR application and to apply legacy behavior otherwise. In another example, the WTRU may be configured to apply a behavior according to any embodiment described herein if there is any active XR traffic (e.g., any of AR, VR, MR, etc.). In another example, the WTRU may be configured to restrict operation according to any embodiment described herein to (e.g., only) the PDU sets and/or data bursts belonging to one or more bearers and/or LCHs and/or application types (e.g., any of AR, VR, MR, etc.).

Embodiments have been described herein with examples of enhancements related to XR applications and/or bearers. Embodiments described herein may be equally applicable to any kind of service (e.g., application) where there may be an interdependence between PDUs, where PDUs of a bearer may be of different types (e.g., importance), where a burst of inter-related PDUs may be received in burst or in a semi periodic manner, etc. Embodiments described herein in terms of PDU sets, data bursts, frames, etc., may be applicable (e.g., mapped) to the behavior of such types of services/applications/traffic.

BSR Triggering Based on a Condition Associated with a PDU Set Delivery

For example, the condition associated with the PDU set delivery may be based on any of a remaining time for the delivery of the PDU set and the amount of outstanding data for the PDU set.

In an embodiment, a WTRU may be configured to trigger a BSR/SR in a case where at least one parameter associated with a transmission of a PDU set satisfies a condition. For example, the WTRU may be configured to trigger a BSR/SR in a case where the TTL for the PDU set is below a (e.g., configured) time duration (e.g., threshold) and the amount of outstanding data for the PDU set is above a buffer size (e.g., threshold).

For example, in a first step, the WTRU may receive (e.g., configuration information indicating) a configuration for sending a buffer status report (BSR) or a scheduling request (SR) related to a PDU set, where the BSR/SR may be triggered in a case where one or more of the following are conditions are satisfied.

In a first example, the BSR/SR may be triggered in a case where the amount of outstanding (e.g., buffered) data of that PDU set (such as e.g., any of a number of PDUs, a size of data in bytes, a percentage of PDUs, etc.) is above a (e.g., configured) buffer size (e.g., threshold).

In a second example, the BSR/SR may be triggered in a case where the TTL for the PDU set is below a (e.g., configured) time duration (e.g., threshold).

For example, in a second step, the WTRU may monitor any of the size of the PDU set in the UL buffer and the TTL of (e.g., for the LCG associated with) the PDU set.

For example, in a third step, upon determining that the buffered size of the pending PDUs of the PDU set is above the buffer size (e.g., threshold) or/and the TTL is below the time duration (e.g., threshold), the WTRU may transmit a BSR/SR related to the PDU set.

Example of BSR Triggering Based on the TTL and/or the Buffered Level

In an embodiment, the WTRU may be configured (e.g., may receive configuration information indicating) to trigger a BSR in a case where a first (e.g., time) condition is satisfied (e.g., in a case where the TTL of a PDU set is below a first threshold). The first threshold may be referred to herein as TTL_threshold. The first threshold, to be used for triggering BSR/report information related to (e.g., a LCG associated with) a PDU set may be indicated in configuration information, received by the WTRU. The configuration information (e.g., received by the WTRU) may indicate the PSDB to be used to compute the TTL of the PDU set, such that the TTL may be compared to the first threshold for triggering BSR/report information related to the PDU set.

In an example, the TTL_threshold may be an absolute time duration value (e.g., five milliseconds).

In another example, the TTL_threshold may be a percentage of the PSDB of the PDU set (e.g., 25% of the PSDB).

In an embodiment, the WTRU may be configured to trigger a BSR in a case where a second (e.g., buffer) condition is satisfied (e.g., in a case where the amount of buffered data for that PDU set (e.g., at any of PDCP, RLC, MAC) is above a second threshold. The second threshold may be referred to herein as buffer_threshold. The second threshold, to be used for triggering BSR/report information related to a PDU set may be indicated in configuration information, received by the WTRU.

In an example, the buffer_threshold may be an absolute value (e.g., 500 Kbytes).

In another example, the buffer_threshold may be a percentage of the PDU set size (e.g., 25% of the total PDU set size, 40% of the PDUs of the PDU set, etc.).

In an embodiment, the WTRU may be configured with one or more condition parameters (e.g., associated with one or more conditions) such as e.g., a TTL_threshold and a buffer_threshold. The WTRU may be further configured to trigger the BSR on determining that at least one of the conditions (e.g., thresholds) are met.

In an embodiment, the WTRU may be configured with at least two condition parameters (e.g., associated with at least two conditions) such as e.g., a TTL_threshold and a buffer_threshold The WTRU may be further configured to trigger the BSR on determining that the at least two conditions (e.g., both thresholds) are met.

In an embodiment, the WTRU may be configured with multiple TTL_threshold and buffer_threshold values (e.g., a first (e.g., high) TTL threshold corresponding with a first (e.g., high) buffer threshold and a second (e.g., lower) TTL threshold corresponding with a second (e.g., lower) buffer threshold).

In an embodiment, the configuration of multiple TTL_threshold and buffer_threshold values may be explicit. For example:

buffer_threshold1=20%, TTL_threshold1=30%
buffer_threshold2=50%, TTL_threshold2=50%
buffer_threshold3=85%, TTL_threshold3=70%
etc.

In an embodiment, the WTRU may be configured with a relationship between condition parameters associated with different conditions (e.g., TTL_thresholds and buffer_thresholds). For example, in a case where (e.g., both) thresholds are percentage values, the WTRU may be configured to apply a linear mapping between the two thresholds, e.g., TTL_threshold=alpha*buffer_threshold. For example, if alpha is equal to 1, the WTRU may trigger a BSR in a case where (e.g., only) x % of the PSDB is remaining and the WTRU has more than x % of the PDU set buffered. In another example, if alpha is equal to 2, the WTRU may trigger a BSR in a case where (e.g., only) x % of the PSDB is remaining and WTRU has more than 0.5x % of the PDU set buffered, etc. Further constraint may be configured to ensure that such a behavior may be effective (e.g., only) in a case where the TTL_threshold is below a value. For example, the WTRU may be configured to apply the mapping (e.g., only) in a case where the TTL_threshold is below 40% (e.g., no BSR may be triggered before 60% of the PSDB may have elapsed).

In one solution, the buffer size which may be compared with the buffer_threshold by the WTRU may be the amount of the PDU set data that may already be available at the WTRU (radio protocol level) buffers (e.g., PDCP and/or RLC and/or MAC, etc.).

In an embodiment, the buffer size which may be compared with the buffer_threshold by the WTRU may consider (e.g., include) PDUs of the PDU set that may not be available (e.g., stored) yet at the WTRU (radio protocol level) buffers (e.g., PDCP and/or RLC and/or MAC, etc.). For example, the WTRU may become informed about the size of the PDU set (e.g., from header information in the first PDU received from application layer), and the WTRU may determine the current buffer level by subtracting the amount (e.g., number) of data (e.g., PDUs) of the PDU set that may have already been transmitted from the total PDU set size.

In an embodiment, the WTRU may be configured to check (e.g., determine) how many or what percentage of the PDUs of the PDU set may (e.g., still) be pending to be transmitted (e.g., at the WTRU buffers) at a time when a PDU is received from the application layer, and in a case where that amount is greater than a threshold, the WTRU may trigger a BSR.

In an embodiment, the WTRU may be configured to send a BSR related to a PDU set in a case where a percentage/number of the PDUs of the PDU set are buffered at the WTRU and no BSR related to the PDU set may have been sent.

Controlling the Number of BSRs Sent

In an embodiment, the WTRU may be configured to trigger a BSR related to (e.g., associated with) a PDU set (e.g., only) in a case where a previous BSR related to (e.g., associated with) the PDU set, triggered according to any embodiment described herein, has not been triggered before, e.g., within a prohibit time duration. For example, if the prohibit time duration is set to infinity, the BSR related to the PDU set may be sent e.g., only once.

In an embodiment, the WTRU may be configured to trigger a BSR related to (e.g., associated with) a PDU set (e.g., only) in a case where the TTL and/or the buffer level has changed by more than a value (e.g., of any of an amount and a percentage) since the previous BSR related to (e.g., associated with) the PDU set triggered according to any embodiment described herein. For example, a WTRU may have been configured to send the BSR related to (e.g., associated with) the PDU set in a case where the TTL falls below 40% and buffer was remaining above 50%. The WTRU may further be configured to send a subsequent BSR related to (e.g., associated with) the same PDU set in a case where the TTL falls below 10% and the buffer is remaining above 30%, etc.

In an embodiment, the WTRU may be configured to not trigger a BSR related to (e.g., associated with) a PDU set for a prohibit time duration after a BSR may have triggered based on legacy BSR triggering mechanisms, in a case where that BSR included information about the LCG the PDU set may be associated with and in a case where the PDU set was already ongoing (e.g., some PDUs of the PDU set were already buffered at the WTRU) at the time the legacy BSR may have been sent. In one variant of the embodiment, instead of a prohibit time, the restriction may be in terms of buffer level increase since the transmission of the legacy BSR. For example, the WTRU may be configured to trigger the BSR related to (e.g., associated with) the PDU set after the legacy BSR in a case where more than an amount of data of the PDU set (e.g., percentage or absolute value) gets buffered at the WTRU.

Aspects Related to PDU Set Characteristics

In an embodiment, the WTRU may be configured to apply a behavior according to any embodiment described herein for any PDU set (e.g., regardless of the PDU set characteristics such as e.g., any of the PDU set type, the importance, the PSDB range, etc.)

In an embodiment, the WTRU may be configured to apply the behavior according to any embodiment described herein (e.g., only) for PDU sets of one or more characteristics, for example, (e.g., only) for PDU sets of an importance level, and/or (e.g., only) for PDU sets of a type, and/or (e.g., only) for PDU sets of a PSDB value (or range), and/or (e.g., only) for PDU sets of a size (e.g., number of PDUs within a PDU set above a value), etc.

In an embodiment, the WTRU may be configured to apply any of different thresholds and different behaviors depending on the characteristics of the PDU set. For example, the buffer level and/or TTL thresholds that may be used to trigger a BSR for a PDU set of any of a first importance level, a first type and a first PSDB may be different from that of PDU sets of any of a second importance level, a second type, and a second PSDB, etc. Other parameters such as prohibit timers described herein may be configured per any of PDU set type, PDU set type importance and PDU set PSDB, etc.

Aspects Related to Multiple Ongoing PDU Sets

For example, there may be multiple ongoing (e.g., pending) PDU sets.

In an embodiment, the WTRU may monitor the BSR triggering condition(s) for a (e.g., each) PDU set independently from other PDU sets (and may trigger the BSRs independently in a case where the condition(s) are fulfilled for the PDU set(s)).

In an embodiment, the WTRU may monitor the BSR triggering condition(s) of (e.g., only) one or a subset of the PDU sets based on, for example, one or more of (i) the importance level (e.g., monitor/trigger BSR for the PDU set with highest importance), (ii) the PDU set type (e.g., monitor/trigger BSR of I-frame PDU sets), (iii) PDU sets with PSDB less/more than a value, (iv) PDU sets with size greater/smaller than a value, etc.

In an embodiment, the WTRU may trigger a BSR based on any embodiment described herein, and the WTRU may include information about (e.g., only) one of the PDU sets e.g., satisfying a condition (e.g., the PDU set with the highest importance, time, etc.) and/or information for more than one of the PDU sets e.g., satisfying a condition (e.g., PDU sets with importance level above a level, PDU sets with TTL less than a level, etc.). The determination to include information about one or more PDU sets may further depend on UL grant information received by the WTRU. For example, in a case where the UL grant information is associated with a large number of resources, the WTRU may include information about (e.g., all) the PDU sets, and in a case where the UL grant information is associated with a smaller number of resources, the WTRU may include information (e.g., only) about the PDU set satisfying a condition e.g., with the highest importance, shortest PSDB/TTL, etc.

In an embodiment, a prohibit timer that may be started when a BSR related to (e.g., associated with) a PDU set may be sent, may prevent the transmission of a subsequent BSR related to (e.g., associated with) any PDU set.

In an embodiment, a prohibit timer that may be started when a BSR related to (e.g., associated with) a PDU set may be sent, may prevent (e.g., only) the transmission of a subsequent BSR related to (e.g., associated with) the same PDU set.

In an embodiment, a prohibit timer that may be started when a BSR related to (e.g., associated with) a PDU set may be sent, may prevent (e.g., only) the transmission of a subsequent BSR related to (e.g., associated with) a PDU set having QoS expectations (e.g., requirements) equal or lower than the PDU set that may have triggered the BSR (e.g., any of longer PSDB, lower importance, etc.).

BSR Triggering Based on Available Information Related to a PDU Set

In an embodiment, a WTRU may be configured to trigger one or more BSRs/SRs related to a PDU set that may be dependent on information that may be available to the WTRU about the PDU set. E.g., the WTRU may receive configuration information indicating to (e.g., trigger) report PDU set related information for uplink traffic, for example, based on the information related to the PDU set being available and/or changing over time.

In a first example, the WTRU may trigger a BSR/SR related to a PDU set, after the arrival of a PDU of a PDU set (e.g., any of the first PDU, an intermediate PDU, the final PDU), (e.g., only) in a case where the WTRU has (e.g., detailed) information about the PDU set (e.g., any of size of the PDU set (e.g., in number of PDUs), periodicity, PSDB, type, importance, etc.). The (e.g., detailed) information may be included in the PDU header. In another example, the (e.g., detailed) information may be made available to (e.g., the network layer of) the WTRU by the application layer. The WTRU may include the (e.g., detailed) information about the PDU set, for example, in the BSR. In another example, reduced information may be provided, such as any of size and timing window when (e.g., all) the data may be expected to be available at the WTRU buffers.

In a second example, the WTRU may trigger a first BSR/SR (e.g., including initial/first information) related to a PDU set after the arrival of the first PDU of a PDU set (e.g., even) if the WTRU does not have (e.g., detailed) information about the PDU set at that time (e.g., the PDU may not include detailed information or WTRU may not have got the (e.g., detailed) information from application layer). The WTRU may include, for example, "expected" data size/timing information in this first BSR. In a case where the (e.g., detailed) information about the PDU set becomes available later (e.g., the WTRU may receive an intermediate PDU that may contain the (e.g., detailed) information, may receive the last PDU of the PDU set with the (e.g., detailed) information, etc.). The WTRU may send a second BSR/SR related to the PDU set that may include correct (e.g., updated) size/timing information. The BSR/SR may include a reduced (e.g., summarized) information, e.g., indicating a request for any of more/less resources, reduce/increase the preferred timing window for the resources' availability, etc.

In an embodiment, the WTRU may be configured to trigger a BSR related to (e.g., associated with) a PDU set (e.g., only) in a case where information about the PDU set is (e.g., becomes) available. The PDU set information may indicate one or more of (i) a PDU set identity (ID), (ii) a PDU set importance level, (iii) a PDU set type, (iv) a PSDB, (v) a size (e.g., in any of bytes, number of PDUs), (v) a first and/or a last PDU of the PDU set (e.g., via start/end indication), (vi) a time (e.g., any of relative and absolute) when (e.g., all) the PDUs of the PDU set may be expected to be available at the WTRU (radio level) buffers, (vii) a PSIHI indicator.

In an example, the PDU set information may become available at the WTRU before the first PDU of the PDU set may be received at the WTRU buffers (e.g., information may be received from application layer about upcoming PDU sets).

In another example, the PDU set information may become available at the WTRU when the first PDU of the PDU set may be received at the WTRU buffers (e.g., in the packet header or as separate information).

In another example, the PDU set information may become available at the WTRU when an intermediate PDU of the PDU may be received at the WTRU buffers (e.g., in the packet header or as separate information).

In another example, the PDU set information may become available at the WTRU when the last PDU of the PDU set may be received at the WTRU buffers (e.g., in the packet header or as separate information). The PDU size information may be implicitly determined by the WTRU, if there is an indication that this may be the last PDU of the PDU set.

In another example, the PDU set information may become available at the WTRU after the last PDU of the PDU set may have been received.

One or more pieces of PDU set information may be implicitly determined from other pieces of information (such as e.g., any of (i) a mapping between PDU set type/importance and QOS flow identifier, (ii) a mapping of PDU set PSDB to PDU set type/importance, (iii) a mapping of PDU set importance with PDU set type, etc., (iv) inter-relatedness or dependency between PDUs sets in different correlated flows).

In an embodiment, the WTRU may be configured to trigger a BSR related to (e.g., associated with) a PDU set in a case where the first PDU of the PDU set is received (e.g., even if (e.g., only) a limited or no detailed information about the PDU set is available at the time).

In an embodiment, the triggering of a BSR on the reception of the first PDU of the PDU set may be conditional on the WTRU being aware of at least one of (i) a PDU set type (e.g., BSR may be triggered on the reception of the first PDU of a PDU set of a (e.g., given) type), (ii) a PDU set importance (e.g., BSR may be triggered on the reception of the first PDU of a PDU set of a (e.g., given) importance), (iii) a PSDB (e.g., BSR may be triggered on the reception of the first PDU of a PDU set (e.g., only) if the PSDB is below a threshold), etc.

In an embodiment, the WTRU may be configured to trigger a BSR related to (e.g., associated with) a PDU set in a case where the last PDU of the PDU set is received.

In an embodiment, the WTRU may be configured to trigger a BSR related to (e.g., associated with) a PDU set when the last PDU of the PDU set is received if one or more of the following conditions are not fulfilled: (i) the first PDU of the PDU set is still buffered at the WTRU and (ii) any of percentage and a number of PDUs of the PDU set is still buffered at the WTRU.

In an embodiment, the WTRU may be configured to trigger a BSR related to (e.g., associated with) a PDU set in a case where a percentage of the PDUs of the PDU set are received at the WTRU (radio) buffer (such as e.g., upon the reception of 50% of the PDUs of the PDU set).

In embodiment, in a case where the WTRU has limited information about the PDU set (e.g., in a case where the first PDU is received), that may not include any size information, the WTRU may send size information in another message (e.g., any of MAC CE, RRC message, a special SR, etc.) e.g., instead of a BSR.

In an embodiment, the WTRU may be configured to send a legacy BSR (e.g., LCG level buffer level indication) in a case where the WTRU has limited or no detailed information about the PDU set.

In an embodiment, in a case where the WTRU has limited or no information about the size of the PDU set when the BSR may be triggered, the WTRU may include an expected (e.g., anticipated) size information in the BSR. For example, the WTRU may estimate the size based on the size of previous PDU sets with the same characteristics (e.g., any of PDU set type, importance level, etc.).

In an embodiment, the WTRU may be configured to include a timing information (e.g., a time window when the (e.g., whole) PDU set may be expected to become available at the WTRU). In an example, the WTRU may include one or more size/timing information in one BSR (e.g., indicating that data of size x may be expected within time t1, addition data of size y may be expected within t2 after t1, etc.).

In an embodiment, a WTRU may trigger a first BSR related to (e.g., associated with) a PDU set with limited/first information about the PDU set and the WTRU may become aware of detailed PDU set information later. The WTRU may be configured to send a subsequent BSR that may add (e.g., amend) the information (e.g., previously sent) in the first BSR. E.g., information about to the PDU set may be sent (e.g., in the subsequent/second BSR) based on the information about the PDU set changing from previous/initial information previously/initially reported (e.g., in the first BSR).

For example, the WTRU may have sent a first BSR related to (e.g., associated with) the PDU set on the reception of the first PDU from application layer (e.g., header may have indicated the PDU set as an important PDU set). For example, the first BSR may indicate no size information or the first BSR may indicate estimated (e.g., expected) size and/or timing information. The WTRU may receive detailed information about the PDU set later. For example, the WTRU may receive an intermediate PDU of the PDU set indicating a size of the PDU set. In another example, the WTRU may receive the last PDU of the PDU set and the WTRU may become aware of the PDU set size. In another example, the WTRU may receive separate information from application layer about the size of the PDU set. For example, the WTRU may send an update BSR that may include the detailed information. In one example, the update BSR may indicate a reference to the previous BSR (e.g., the BSRs may indicate any of BSR ID and a counter), and may include a delta/full information (e.g., any of the total size information for the PDU set, the difference from the previously indicated size and the newly determined value, the absolute timing information about the PDU set, the difference from the previously indicated timing information and the newly determined information, etc.).

In an embodiment, after determining the detailed information about the PDU set, the WTRU may include any of a special flag and indicator in the header of the PDU of the PDU set that the WTRU may be sending, to indicate to the network that the WTRU may have detailed (e.g., complete) information about the PDU set. The network may send information to the WTRU for requesting the WTRU to send the detailed information of the PDU set (e.g., and WTRU may send the requested detailed information in any of a subsequent BSR, in an RRC message, etc.).

In an embodiment, in a case where the WTRU has indicated a different size (e.g., lower or higher) than the actual size of the PDU set in the first BSR the WTRU may have sent, the WTRU may include information in the second BSR indicating the difference.

In an embodiment, after getting detailed information about the PDU set, the WTRU may send information confirming the first BSR that may have been sent with estimated information (e.g., any of size, data arrival timing (e.g., arrival time), etc.) in a case where the detailed information is similar (e.g., comparable) to the information provided in the first BSR (e.g., current size within a percentage of the size reported in the first BSR, data arrival timing with a percentage of the data arrival window indicated in the first BSR, etc.).

In an embodiment, the WTRU may be configured to apply one or more of the behaviors described herein based on the PDU set characteristics.

For example, the WTRU may send a BSR on the first PDU of a PDU set, (e.g., only) in a case where the PDU set is of importance level equal to a value x.

For example, the WTRU may send a BSR on the first PDU of a PDU set for a PDU set of importance level equal to or less than a value y, (e.g., only) in a case where (e.g., all) the detailed information about the PDU set is available at the reception of the first PDU.

For example, for PDUs of one or more characteristics (e.g., type), the WTRU may send the BSR (e.g., only) on the reception of the last PDU.

For example, for PDUs of one or more characteristics (e.g., type), the WTRU may send the BSR (e.g., only) after detailed information about the PDU set may become available.

For example, for PDUs of a type and/or importance, the WTRU may send a maximum of one BSR (e.g., first PDU, even if the detailed information is not available at the time).

For example, the WTRU may not send a BSR regarding PDU sets of any of a (e.g., given) type, PSDB, size, importance, etc.

For example, a BSR regarding PDU sets of any of a (e.g., given) type, PSDB, size may be sent (e.g., only) in a case where there is a space available for a padding BSR.

In an embodiment, the WTRU may be configured to trigger a subsequent BSR related to (e.g., associated with) a PDU set in a case where a (e.g., prohibit) time duration has elapsed since the first BSR related to the PDU set may have been sent with (e.g., initial, limited, first) information. For example, in a case where the (e.g., detailed, subsequent, second) information may have become available, the WTRU may wait until expiration of the prohibit time duration before sending the subsequent (e.g., updated) BSR. E.g., the WTRU may refrain from sending the (e.g., detailed, subsequent, second, updated) information about the PDU set in the BSR for the (e.g., prohibit) time duration after sending the (e.g., initial, limited, first) information about the PDU set in the first BSR. In a variant, this behavior may be dependent on the characteristics of the PDU set. For example, the WTRU may be configured to ignore the prohibit time duration in a case where one or more characteristics associated with the PDU triggering the BSR are satisfying a condition (e.g., being a PDU set of importance level x, being of type y, having a PSDB less than z, etc.).

In an embodiment, the WTRU may be configured to trigger a subsequent BSR related a PDU set (e.g., only) in a case where the detailed information about the PDU set becomes available within a (e.g., given) time duration after the sending of the first BSR related to the PDU set.

In an embodiment, the WTRU may be configured to apply any behavior described herein (e.g., only) for PDU sets of one or more characteristics. For example, the WTRU may be configured to apply any behavior described herein (e.g., only) for PDU sets of any of (i) an importance level, (ii) a type, (iii) a PSDB value/range, (iv) a size (e.g., number of PDUs within a PDU set above a value), etc.

In an embodiment, a WTRU may have multiple ongoing (e.g., pending) PDU sets (e.g., to be transmitted). The WTRU may monitor the triggering conditions for subsequent BSRs for the different PDU sets independently (and may trigger the subsequent BSRs independently after the detailed information about a (e.g., each) PDU set may become available).

In an embodiment, a WTRU may have multiple ongoing (e.g., pending) PDU sets (e.g., to be transmitted). The WTRU may monitor the triggering conditions for a subsequent BSR of (e.g., only) one or a subset of the PDU sets based on, for example, one or more of (i) the importance level (e.g., monitor/trigger subsequent BSR for the PDU set with highest importance), (ii) the PDU set type (e.g., monitor/trigger subsequent BSR of I-frame PDU sets), (iii) (e.g., only) PDU sets with PSDB less than a value may trigger a subsequent BSR, and (iv) (e.g., only) PDU sets with size greater than a value may trigger a subsequent BSR, etc.

In an embodiment, a WTRU may have multiple ongoing (e.g., pending) PDU sets (e.g., to be transmitted). The WTRU may trigger a BSR based on any embodiment described herein. The WTRU may include information about (e.g., only) one of the PDU sets (e.g., the PDU set with the highest importance, given time, etc.) or information for more than one PDU sets satisfying a condition (e.g., PDU sets with importance level above a level, PDU sets with TTL/PSDB less than a threshold, etc.). The determination to include information about one or more PDU sets may be further according to UL grant information received by the WTRU. For example, in a case the UL grant information is associated with a large number of resources, the WTRU may include information about more than one (e.g., all) PDU sets. In a case the UL grant information is associated with a smaller number of resources, the WTRU may include information (e.g., only) about the PDU set satisfying a condition (e.g., with any of the highest importance, shortest PSDB/TTL, etc.).

BSR Triggering Based on a Condition

In an embodiment, a WTRU may be configured to trigger a BSR/SR based on any of radio condition(s) and condition(s) related to ongoing PDU sets.

For example, the WTRU may receive (e.g., configuration information indicating) a configuration for triggering a BSR/SR that may be dependent on one or more of the following conditions.

In a first example of condition, the BSR/SR may be triggered based on one or more radio conditions towards the source or/and the target.

In a second example of condition, the BSR/SR may be triggered based on the remaining PDUs of ongoing PDU sets (e.g., any of a number of ongoing PDU sets, a size of remaining PDUs of PDU sets, etc.), wherein (i) all PDU sets may be considered or (ii) (e.g., only) a part of the PDU sets may be considered (e.g., any of PDU sets of a type or importance, PDU sets with PSDB below a threshold, PDU sets with TTL below a threshold, PDU sets with (e.g., only) a percentage/number of PDUs pending, etc.)

In a case where any of the conditions are satisfied, the WTRU may send a BSR/SR to the network including information about the ongoing PDU sets.

In an embodiment, the WTRU may be configured to trigger a BSR depending on one or more radio conditions.

For example, the WTRU may trigger a BSR in a case where a cell radio quality metric associated with the current serving cell (e.g., RSRP) fails to satisfy a quality condition (e.g., falls below a threshold).

For example, the WTRU may trigger a BSR in a case where the cell radio quality metric associated with the current serving cell fails to satisfy a quality condition (e.g., is worse than a quality metric of neighbor cell by more than a threshold.

For example, the WTRU may trigger a BSR in a case where a quality metric associated with a neighbor serving cell satisfies a quality condition (e.g., becomes better than a threshold).

Any radio condition associated with any quality metric associated with any of the serving cell and a neighbor cell for triggering a BSR may be applicable to embodiments described herein.

For example, any measurement event (e.g., A1 to A6, etc.) may be configured to trigger a BSR, in addition or in replacement of a measurement report.

In an embodiment, in a case where the WTRU is (e.g., also) sending a measurement report, the buffer status information may be sent in an RRC message (e.g., within the measurement report, and/or in a different RRC message, etc.). Sending buffer related information via RRC compared to MAC CE based BSR may allow to include more detailed information.

In an embodiment, a BSR may be triggered according to one or more radio conditions, independently on ongoing PDU sets are and/or independently on the amount of PDU set data that may be buffered at the WTRU.

In an embodiment, a BSR may be triggered in a case where one or more (e.g., radio) conditions for triggering the BSR are satisfied and the (e.g., total) size of buffered PDUs (of (e.g., all) ongoing PDU sets) satisfy a condition (e.g., is above/below a threshold (e.g., total_buffer_threshold). The size and/or the condition (e.g., threshold) may be in any of bytes and number of PDUs.

In an embodiment, the buffer size to be compared with the total_buffer_threshold may include PDUs of the (related, ongoing) PDU set(s) that may not be available yet at the WTRU (radio protocol level) buffers (e.g., PDCP and/or RLC and/or MAC, etc.). For example, the WTRU may be informed about the size of the PDU set (e.g., from header information in the first PDU received from application layer), and the WTRU may determine the current total buffer level by subtracting the amount (e.g., number) of data (e.g., PDUs) of the PDU set(s) that may have already been transmitted from the total PDU set(s) size.

In an embodiment, the WTRU may be configured with a set of radio conditions and buffer conditions (e.g., thresholds). For example, the WTRU may be configured to trigger a BSR according to any of the following examples.

In a first example, WTRU may be configured to trigger a BSR in a case where a radio quality metric associated with serving cell (e.g., RSRP) is less than a first threshold (RSRP<RSRP_threshold_1) and in a case where the amount of buffered data is less than or equal to a first buffer threshold (total_buffer<=total_buffer_threshold_1).

In a second example, the WTRU may be configured to trigger a BSR in a case where the radio quality metric associated with serving cell (e.g., RSRP) is between a first and a second thresholds (e.g., RSRP_threshold_1 and RSRP_threshold_2) and the amount of buffered data is less than or equal to a second buffer threshold (e.g., total_buffer<=total_buffer_threshold_2).

In a third example, the WTRU may be configured to trigger a BSR in a case where the radio quality metric associated with serving cell (e.g., RSRP) is between a second and a third thresholds (e.g., RSRP_threshold_2 and RSRP_threshold_3) and the amount of buffered data is less than or equal to a third buffer threshold (e.g., serving cell RSRP between RSRP_threshold_2 and RSRP_threshold_3 and total_buffer<=total_buffer_threshold_3).

In embodiment, (e.g., only) PDU sets of a first type may be included in the total buffer calculation that may be compared with the threshold.

In an embodiment, (e.g., only) PDU sets of first importance may be included in the total buffer calculation.

In an embodiment, (e.g., only) PDU sets of a PSDB satisfying a condition (e.g., PSDB less than a threshold) may be included in the total buffer calculation.

In an embodiment, (e.g., only) PDU sets of a first TTL (e.g., calculated at the time the BSR may be constructed) may be included in the total buffer calculation.

In an embodiment, (e.g., only) PDU sets of a size satisfying a condition (e.g., PDU set size greater/less than n PDUs, less/more than x bytes, etc.) may be included in the total buffer calculation.

In an embodiment, separate (e.g., different) buffer condition parameters (e.g., total_buffer_threshold(s)) may be configured for different PDU sets (e.g., of any of different types, importance levels, PSDB ranges, size ranges, etc.), which (e.g., each) may be further associated with one or more radio condition thresholds. For example, the WTRU may be configured to trigger the BSR in a case where any of the radio conditions and the buffer conditions are satisfied for one of the PDU set of any of type(s), importance level(s), PSDB range(s), etc. In another example, the WTRU may be configured to trigger the BSR (e.g., only) in a case where the condition(s) are fulfilled for more than one (or only if all) of the PDU set any of type(s), importance level(s), PSDB range(s), etc.

In an embodiment, any of the buffer level and radio level condition parameters (e.g., threshold(s)) may be configured to be associated with (e.g., specific to) a particular PDU set (e.g., identified by a PDU set identity (e.g., identifier)).

In embodiments described herein, the buffer related threshold may be the percentage of the PDUs of the (corresponding) PDU set(s) (e.g., if the PDU set size information is available) that may be buffered rather than the number of buffered PDUs.

In embodiments described herein, the buffer related threshold may be the percentage of the total size of the (corresponding) PDU set(s) (e.g., if the PDU set size information is available) that may be buffered rather than total buffered size of the PDU set(s).

In an embodiment, the BSR may include information about (e.g., only) the PDU set(s) that may have triggered the BSR.

In an embodiment, the BSR may include information (e.g., also) about PDU set(s) that may not have triggered the BSR (e.g., based on UL granted resource availability).

In an embodiment, the WTRU may be configured to trigger a BSR (e.g., immediately) after recovery from RLF (e.g., any of re-establishment, executing a CHO after cell selection after RLF led to selecting a CHO prepared cell, etc.).

In an embodiment, the WTRU may be configured to trigger a BSR (e.g., immediately) after executing a handover (e.g., any of legacy HO after a reception of the HO command, executing a DAPS HO, CHO, etc.).

In an embodiment, the WTRU may be configured to trigger a BSR (e.g., immediately) after transitioning from idle (e.g., any of IDLE and INACTIVE) state (e.g., in a case where the state transition was triggered based on the arrival of an UL PDU set of any of a first type, first size, first importance, etc.).

In an embodiment, the WTRU may be configured with a CHO configuration that may be configured with two radio conditions (e.g., thresholds), the first radio threshold (e.g., neighbor cell>serving cell+thresh1) to trigger a BSR, and a second radio threshold (e.g., neighbor cell>serving cell+thresh2, where thresh2>thresh1) to trigger the execution of the CHO. Conditions related to buffer levels may be applied along with (e.g., together with) the first radio threshold (e.g., a BSR may not be triggered if the buffer related conditions (e.g., thresholds) are not fulfilled for the corresponding (e.g., ongoing) PDU sets).

In an embodiment, the WTRU may be configured with a CHO configuration that may include a radio threshold (e.g., neighbor cell>serving cell+thresh1), and a time duration information. On the fulfillment of the radio condition, the WTRU may trigger a BSR (e.g., in a case where the buffer related thresholds are (e.g., also) fulfilled for the corresponding (e.g., ongoing) PDU sets) and may wait (e.g., for executing the CHO) until the configured time duration may have elapsed since any of the fulfillment of the conditions and a successful transmission of one or more of the PDU set(s) that may have triggered the BSR.

In embodiment, the WTRU may receive a handover command, indicating (e.g., requesting) the WTRU to execute the HO (e.g., immediately) if, for example, one or more buffer related conditions for the ongoing PDU set(s), according to any embodiment described herein, are not fulfilled. In another example, if one or more buffer related conditions for the ongoing PDU set(s) are fulfilled, the WTRU may be configured to wait for a time duration (e.g., indicated in the HO command) before executing the HO and may send a BSR. The WTRU may execute the HO command after the configured time duration may have elapsed since the reception of the HO command or after one or more of the corresponding PDU set(s) that may have triggered the BSR may have been successfully transmitted.

Figure 5:
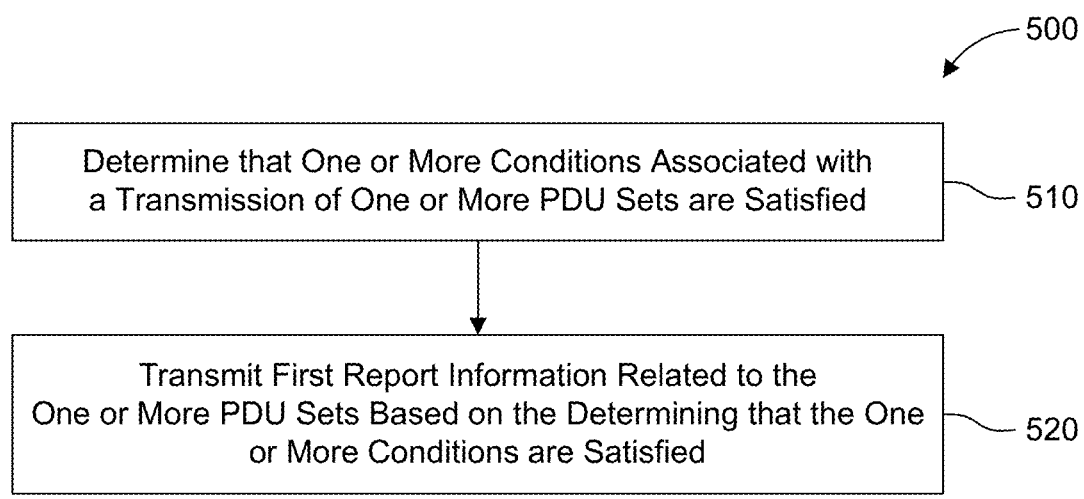
FIG. 5 is a diagram illustrating an example method for transmitting buffer status report information.

FIG. 5 is a diagram illustrating an example method 500 for transmitting buffer status report information. The method 500 may be implemented in a WTRU.

As shown at 510, the WTRU may determine that one or more (e.g., a first) condition(s) associated with (e.g., remaining time for) a transmission of one or more PDU sets may be satisfied, wherein e.g., a PDU set may comprise more than one PDUs that may be associated with each other.

As shown at 520, the WTRU may transmit first (e.g., buffer status) report information related to the one or more PDU sets based on the determining that the one or more (e.g., first) condition(s) may be satisfied. In various embodiments, the report information may indicate the remaining time for the transmission of the PDU set and a size of buffered data for at least the PDU set.

In various embodiments, the one or more conditions may be satisfied in a case where an amount of buffered data to be transmitted by the WTRU and associated with the one or more PDU sets satisfies a first condition.

In various embodiments, the first condition may be satisfied in a case where the amount of buffered data to be transmitted by the WTRU is above a first threshold.

In various embodiments, the amount of buffered data to be transmitted by the WTRU and satisfying the first condition may comprise PDUs of different PDU sets, wherein the PDUs of the different PDU sets may be associated with a same characteristic.

In various embodiments, the same characteristic may comprise any of a same type, a same importance and a PSDB below a value.

In various embodiments, the one or more conditions may be satisfied in a case where a TTL associated with the one or more PDU sets satisfies a second condition.

In various embodiments, the second condition may be satisfied in a case where the TTL associated with the one or more PDU sets is below a second threshold.

In various embodiments, the one or more conditions may be satisfied in a case where a first PDU of the PDU set is available to be transmitted by the WTRU.

In various embodiments, the WTRU may further transmit second (e.g., buffer status) report information indicating one or more characteristics associated with the PDU set.

In various embodiments, the information indicating the one or more characteristics associated with the PDU set may be available to the WTRU after the WTRU may have transmitted the first (e.g., buffer status) report information.

In various embodiments, the one or more conditions may be satisfied in a case where one or more radio conditions towards any of a source network element and a target network element are satisfied.

In various embodiments, the one or more radio conditions may be satisfied in a case where a radio quality associated with the source network element is below a third threshold.

In various embodiments, the one or more radio conditions may be satisfied in a case where a first radio quality associated with the source network element is below a second radio quality associated with the target network element by a fourth threshold.

In various embodiments, the one or more radio conditions may be satisfied in a case where a radio quality associated with the target network element is above a fifth threshold.

In various embodiments, the WTRU may further receive configuration information indicating the one or more conditions associated with a transmission of the one or more PDU sets.

In various embodiments, the WTRU may receive first configuration information indicating the first condition associated with a remaining time for a transmission of the PDU set.

In various embodiments, the first condition may be satisfied in a case where the remaining time for the transmission of the PDU set is below a first threshold.

In various embodiments, the first condition may be satisfied in a case where the remaining time for the transmission of the PDU set is below a first threshold. In various embodiments, the first configuration information may indicate the first threshold.

In various embodiments, the WTRU may determine that a second condition associated with the size of buffered data may be satisfied, and the report information may be transmitted based on the determination that the second condition may be satisfied.

In various embodiments, the WTRU may receive second configuration information indicating the second condition associated with the size of buffered data.

In various embodiments, the second condition may be satisfied in a case where the size of buffered data is above a second threshold.

In various embodiments, the second condition may be satisfied in a case where the size of buffered data is above a second threshold. In various embodiments, the second configuration information may indicate the second threshold.

In various embodiments, the buffered data may comprise PDUs of different PDU sets, and the PDUs of the different PDU sets may be associated with a same characteristic.

In various embodiments, the same characteristic may comprise any of a same type, a same importance and a PSDB below a value.

In various embodiments, the report information may indicate one or more characteristics associated with the PDU set.

In various embodiments, the report information may indicate the size of buffered data in any of a percentage of a PDU set size and an absolute value.

In various embodiments, the report information may indicate the size of buffered data as any of a number of bytes and a number of PDUs.

In various embodiments, the first configuration information and the second configuration information may be received in a same piece of configuration information (e.g., message), or in different pieces of configuration information (e.g., different messages).

Figure 6:
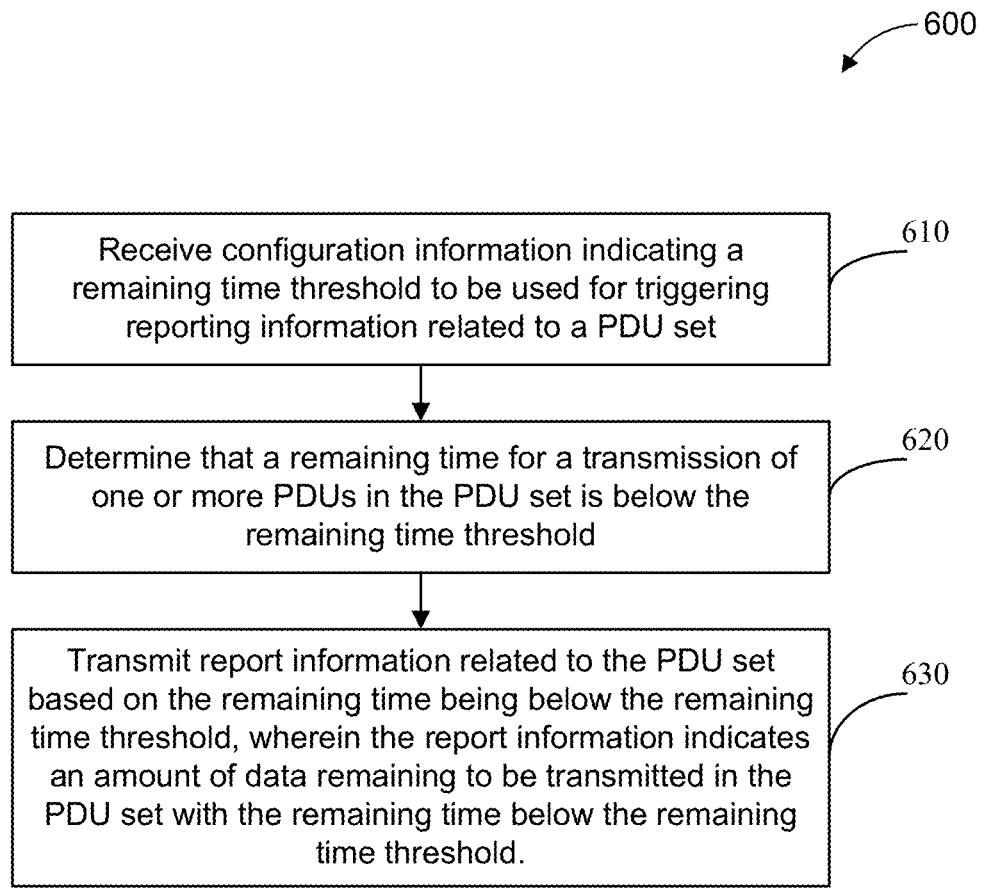
FIG. 6 is a diagram illustrating an example method for transmitting report information.

FIG. 6 is a diagram illustrating an example method 600 for transmitting report information. The method 600 may be implemented in a WTRU. The WTRU may comprise circuitry including any of a processor, a memory, a transmitter and a receiver. The circuitry may be configured to process the method 600. As shown at 610, the WTRU may receive configuration information indicating a remaining time threshold to be used for triggering reporting information related to a PDU set. As shown at 620, the WTRU may determine that a remaining time for a transmission of (e.g., one or more PDUs in) the PDU set may be below the remaining time threshold. As shown at 630, the WTRU may transmit report information related to the PDU set based on the remaining time being below the remaining time threshold. In various embodiments, the report information may indicate an amount of data remaining to be transmitted in the PDU set with the remaining time below the remaining time threshold.

In various embodiments, the amount of data remaining to be transmitted in the PDU set may be indicated (e.g., in the report information) as an absolute value.

In various embodiments, the amount of data remaining to be transmitted in the PDU set may be indicated (e.g., in the report information) in bytes.

In various embodiments, the amount of data remaining to be transmitted in the PDU set may be indicated (e.g., in the report information) as an index referring to one or more values.

In various embodiments, the report information may indicate the remaining time for the transmission of the PDU set. In various embodiments, the indicated remaining time may be the remaining time at a time of construction of the report information.

In various embodiments, the configuration information may be received in a radio resource control message.

In various embodiments, the report information may be received in a MAC CE.

In various embodiments, the PDU set may comprise more than one PDUs that may be associated with each other.

In various embodiments, the configuration information may indicate a second threshold to be used for triggering reporting information related to the PDU set.

In various embodiments, the WTRU may determine that the amount of data remaining to be transmitted in the PDU set may be above the second threshold. In various embodiments, the report information may be transmitted based on the determination that the amount of data remaining to be transmitted in the PDU set may be above the second threshold.

In various embodiments, the report information may indicate one or more characteristics associated with the PDU set.

Figure 7:
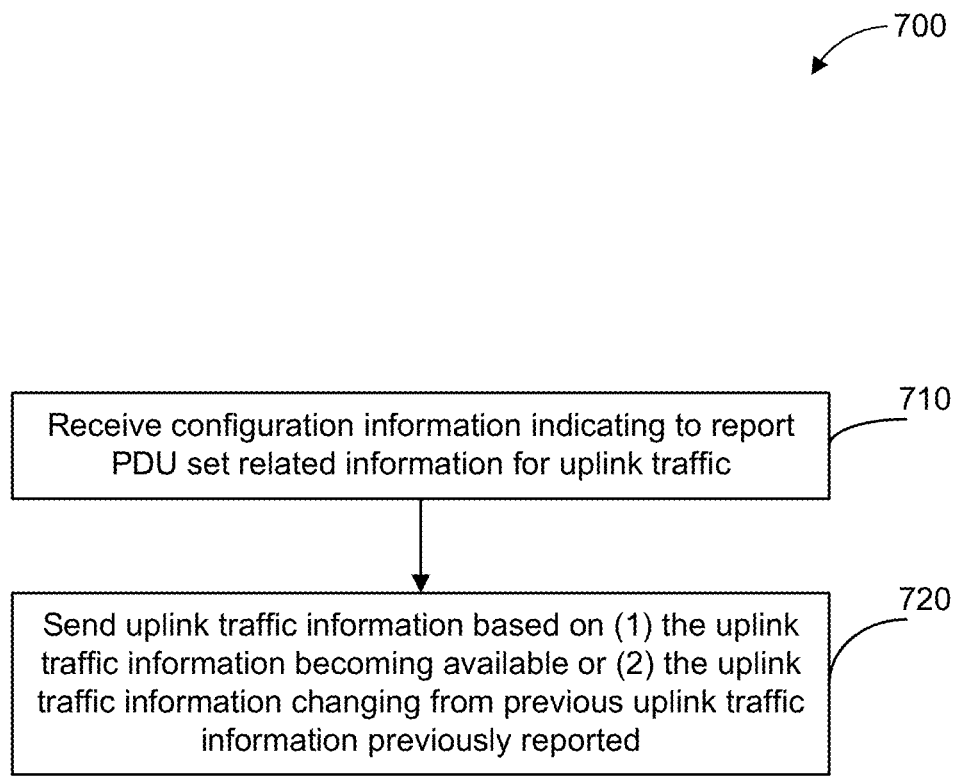
FIG. 7 is a diagram illustrating an example method for transmitting uplink traffic information.

FIG. 7 is a diagram illustrating an example method 700 for transmitting uplink traffic information. The method 700 may be implemented in a WTRU. The WTRU may comprise circuitry including any of a processor, a memory, a transmitter and a receiver. The circuitry may be configured to process the method 700. As shown at 710, the WTRU may receive configuration information indicating to report PDU set related information for uplink traffic. As shown at 720, the WTRU may send uplink traffic information based on (1) the uplink traffic information becoming available or (2) the uplink traffic information changing from previous uplink traffic information previously reported. In various embodiments, the uplink traffic information may indicate an identification of a PDU set, an arrival time and a traffic periodicity.

In various embodiments, the WTRU may refrain from sending subsequent uplink traffic information for the PDU set for a time duration after sending the uplink traffic information.

Any characteristic, variant or embodiment described for a method is compatible with an apparatus device comprising means for processing the disclosed method, with a device comprising circuitry including any of a memory, a processor, a transmitter and a receiver (e.g., operatively coupled to the processor), configured to process the disclosed method, with a computer program product comprising program code instructions and with a non-transitory computer-readable storage medium storing program instructions.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

What is claimed is:

1. A wireless transmit/receive unit (WTRU) comprising circuitry including any of a processor, a memory, a transmitter and a receiver, the circuitry being configured to:
   receive configuration information indicating a remaining time threshold to be used for triggering transmission of a report related to a logical channel group (LCG);
   determine that a remaining time for a transmission of one or more protocol data units (PDUs) associated with the LCG is below the remaining time threshold; and
   transmit the report related to the LCG in a medium access control (MAC) control element (MAC CE) based on at least the remaining time being below the remaining time threshold, wherein the report comprises an indication of (i) the remaining time associated with the LCG and (ii) an amount of data associated with the LCG.

2. The WTRU of claim 1, wherein the indication of the amount of data associated with the LCG is indicated as an absolute value.

3. The WTRU of claim 1, wherein the indication of the amount of data associated with the LCG is indicated in bytes.

4. The WTRU of claim 1, wherein the indication of the amount of data associated with the LCG is indicated as an index referring to one or more values.

5. The WTRU of claim 1, wherein the configuration information is received in a radio resource control message.

6. The WTRU of claim 1, wherein the configuration information indicates a second threshold to be used for triggering transmission of the report LCG.

7. The WTRU of claim 6, wherein the circuitry is further configured to determine that the amount of data associated with the LCG is above the second threshold, and wherein the circuitry being configured to transmit the report related to the LCG comprises the circuitry being configured to transmit the report related to the LCG based on the determination that amount of data associated with the LCG being above the second threshold.

8. A method implemented in a wireless transmit/receive unit (WTRU), the method comprising:
   receiving configuration information indicating a remaining time threshold to be used for triggering transmission of a report related to a logical channel group (LCG);
   determining that a remaining time for a transmission of one or more protocol data units (PDUs) associated with the LCG is below the remaining time threshold; and
   transmitting the report related to the LCG in a medium access control (MAC) control element (MAC CE) based on at least the remaining time being below the remaining time threshold, wherein the report comprises an indication of (i) the remaining time associated with the LCG and (ii) an amount of data associated with the LCG.

9. The method of claim 8, wherein the indication of the amount of data associated with the LCG is indicated as an absolute value.

10. The method of claim 8, wherein the indication of the amount of data associated with the LCG is indicated in bytes.

11. The method of claim 8, wherein the indication of the amount of data associated with the LCG is indicated as an index referring to one or more values.

12. The method of claim 8, wherein the configuration information is received in a radio resource control message.

13. The method of claim 8, wherein the configuration information indicates a second threshold to be used for triggering transmission of the report related to the LCG.

14. The method of claim 13, further comprising determining that the amount of data associated with the LCG is above the second threshold, wherein transmitting the report related to the LCG further comprises transmitting the report related to the LCG based on the amount of data associated with the LCG being above the second threshold.

* * * * *